(12) United States Patent
Noto

(10) Patent No.: US 9,883,106 B2
(45) Date of Patent: Jan. 30, 2018

(54) IMAGE PICKUP APPARATUS AND METHOD OF CONTROLLING IMAGE PICKUP APPARATUS

(71) Applicant: CANON KABUSHIKI KAISHA, Tokyo (JP)

(72) Inventor: Goro Noto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/052,077

(22) Filed: Feb. 24, 2016

(65) Prior Publication Data
US 2016/0255277 A1 Sep. 1, 2016

(30) Foreign Application Priority Data

Feb. 27, 2015 (JP) .................... 2015-039097

(51) Int. Cl.
| H04N 5/225 | (2006.01) |
|---|---|
| H04N 5/222 | (2006.01) |
| H04N 5/228 | (2006.01) |
| G03B 13/02 | (2006.01) |
| H04N 5/232 | (2006.01) |
| G02B 7/04 | (2006.01) |
| G02B 7/28 | (2006.01) |

(Continued)

(52) U.S. Cl.
CPC ........... H04N 5/23287 (2013.01); G02B 7/04 (2013.01); G02B 7/102 (2013.01); G02B 7/282 (2013.01); G02B 7/287 (2013.01); H04N 5/23212 (2013.01); H04N 5/23245 (2013.01); H04N 5/23258 (2013.01); H04N 5/23293 (2013.01);

(Continued)

(58) Field of Classification Search
CPC .............. G03B 13/02; G03B 23/14; G03B 2205/0007; G03B 2217/005; G03B 2205/0053; G03B 7/10; H04N 5/23293; H04N 5/23248; H04N 5/23216; H04N 5/23212; G02B 13/02; G02B 17/20; G02B 27/646; G02B 7/04
USPC ......... 348/333.13, 333.01, 341, 333.02, 357; 396/373, 148, 133; 356/8
See application file for complete search history.

(56) References Cited

U.S. PATENT DOCUMENTS 5,751,351 A 5/1998 Mogi
6,091,450 A 7/2000 Hirasawa
(Continued)

FOREIGN PATENT DOCUMENTS

| JP | 2012-037777 A | 2/2012 |
| JP | 5110824 B | 12/2012 |
| JP | 2013-255310 A | 12/2013 |

OTHER PUBLICATIONS

European Search Report dated Jun. 14, 2016, that issued in the corresponding European Patent Application No. 16155885.3.

Primary Examiner — Xi Wang
(74) Attorney, Agent, or Firm — Cowan, Liebowitz & Latman, P.C.

(57) ABSTRACT

An image pickup apparatus, including: an observation unit configured to observe an object; a detector configured to detect whether or not a user observes the object through use of the observation unit; and a controller configured to control an actuator, the actuator being configured to drive at least a part of an photography optical system and being capable of performing a first operation and a second operation different from the first operation, the second operation being an operation for maintenance of the actuator, wherein, when the detector detects that the user does not observe the object through use of the observation unit, the controller causes the actuator to perform the second operation.

11 Claims, 13 Drawing Sheets

(51) Int. Cl.
*G02B 7/10* (2006.01)
*G02B 27/64* (2006.01)
*H02N 2/00* (2006.01)

(52) U.S. Cl.
CPC ......... *H04N 5/23296* (2013.01); *G02B 27/64* (2013.01); *H02N 2/00* (2013.01); *H04N 5/23216* (2013.01); *H04N 5/23248* (2013.01)

(56) References Cited

U.S. PATENT DOCUMENTS

| | | | |
|---|---|---|---|
| 2004/0201717 A1* | 10/2004 | Matsushima | H04N 1/3333 348/222.1 |
| 2005/0128341 A1 | 6/2005 | Murakami | |
| 2009/0109316 A1* | 4/2009 | Matsui | H04N 5/23293 348/333.01 |
| 2011/0102610 A1 | 5/2011 | Sato | |
| 2011/0249165 A1* | 10/2011 | Churei | G03B 13/02 348/333.02 |
| 2012/0082444 A1* | 4/2012 | Yumiki | G02B 7/36 396/125 |
| 2012/0120258 A1* | 5/2012 | Boutell | G03B 11/048 348/207.1 |
| 2014/0347541 A1* | 11/2014 | Okazaki | H04N 5/23293 348/333.02 |
| 2016/0004619 A1* | 1/2016 | Rothkopf | G06F 11/3058 702/184 |

\* cited by examiner

IMAGE PICKUP APPARATUS AND METHOD OF CONTROLLING IMAGE PICKUP APPARATUS

BACKGROUND OF THE INVENTION

Field of the Invention

The present invention relates to an image pickup apparatus and a method of controlling the image pickup apparatus.

Description of the Related Art

Hitherto, there has been proposed an actuator in which, through the generation of elliptic motion at a predetermined position of a vibrator, the vibrator and a friction member that is brought into friction contact with the vibrator are relatively displaced. Further, an image pickup apparatus including such actuator as a drive source for a mechanism portion of a camera and a lens has also been proposed.

The vibrator forming the above-mentioned actuator is constituted, for example, such that a piezoelectric element serving as an electromechanical energy conversion element is connected to an elastic body such as a metal, and two-phase AC voltages having different phases can be applied to the piezoelectric element. A vibration wave is excited on a surface of the vibrator through application of the voltages to the piezoelectric element to pressurize the vibrator to the friction member, to thereby relatively displace the vibrator and the friction member. In this manner, the vibrator is slid on a surface of the friction member with desired drive force.

The actuator has a feature of being able to be held at an original position even after the application of the voltages is stopped. The reason for this is as follows. The vibrator is in a pressure-contact with the surface of the friction member, and hence friction force is generated. Such friction force is also referred to as holding force.

However, when the vibrator is held at the same position on the surface of the friction member for a long period of time, a slight amount of water in air aggregates in a contact portion between the vibrator and the friction member, with the result that friction force, that is, holding force decreases. When external force is applied under a state in which holding force is decreased, the actuator may move in some cases. When the actuator configured to drive a lens moves, an out-of-focus problem may occur.

In view of the foregoing, a technology of recovering decreased holding force has also been proposed (Japanese Patent No. 5110824).

SUMMARY OF THE INVENTION

According to an aspect of an embodiment, there is provided an image pickup apparatus, including: an observation unit configured to observe an object; a detector configured to detect whether or not a user observes the object through use of the observation unit; and a controller configured to control an actuator, the actuator being configured to drive at least a part of an photography optical system and being capable of performing a first operation and a second operation different from the first operation, the second operation being an operation for maintenance of the actuator, wherein, when the detector detects that the user does not observe the object through use of the observation unit, the controller causes the actuator to perform the second operation.

According to another aspect of an embodiment, there is provided an image pickup apparatus, including: a display unit configured to display an image of an object; a detector configured to detect whether or not a user observes the object through use of the display unit; and a controller configured to control an actuator, the actuator being configured to drive at least a part of an photography optical system and being capable of performing a first operation and a second operation different from the first operation, the second operation being an operation for maintenance of the actuator, wherein, in one of cases where an image of the object is not displayed on the display unit and where the detector detects that the user does not observe the object through use of the display unit, the controller causes the actuator to perform the second operation.

According to further another aspect of an embodiment, there is provided a method of controlling an image pickup apparatus, including: detecting whether or not a user observes an object through use of an observation unit; and causing an actuator to perform a second operation when it is detected that the user does not observe the object trough use of the observation unit, the actuator being configured to drive at least a part of an photography optical system and being capable of performing a first operation and a second operation different from the first operation, the second operation being an operation for maintenance of the actuator.

According to further another aspect of an embodiment, there is provided a method of controlling an image pickup apparatus, comprising: detecting whether or not a user observes an object through use of a display unit; and causing an actuator to perform a second operation in one of cases where an image of the object is not displayed on the display unit and where it is detected that the user does not observe the object through use of the display unit, the actuator being configured to drive at least a part of an photography optical system and being capable of performing a first operation and the second operation, the second operation being an operation for maintenance of the actuator.

Further features of the present invention will become apparent from the following description of exemplary embodiments with reference to the attached drawings.

DESCRIPTION OF THE EMBODIMENTS

Exemplary embodiments of the present invention are hereinafter described in detail with reference to the attached drawings.

First Embodiment

Figure 1:
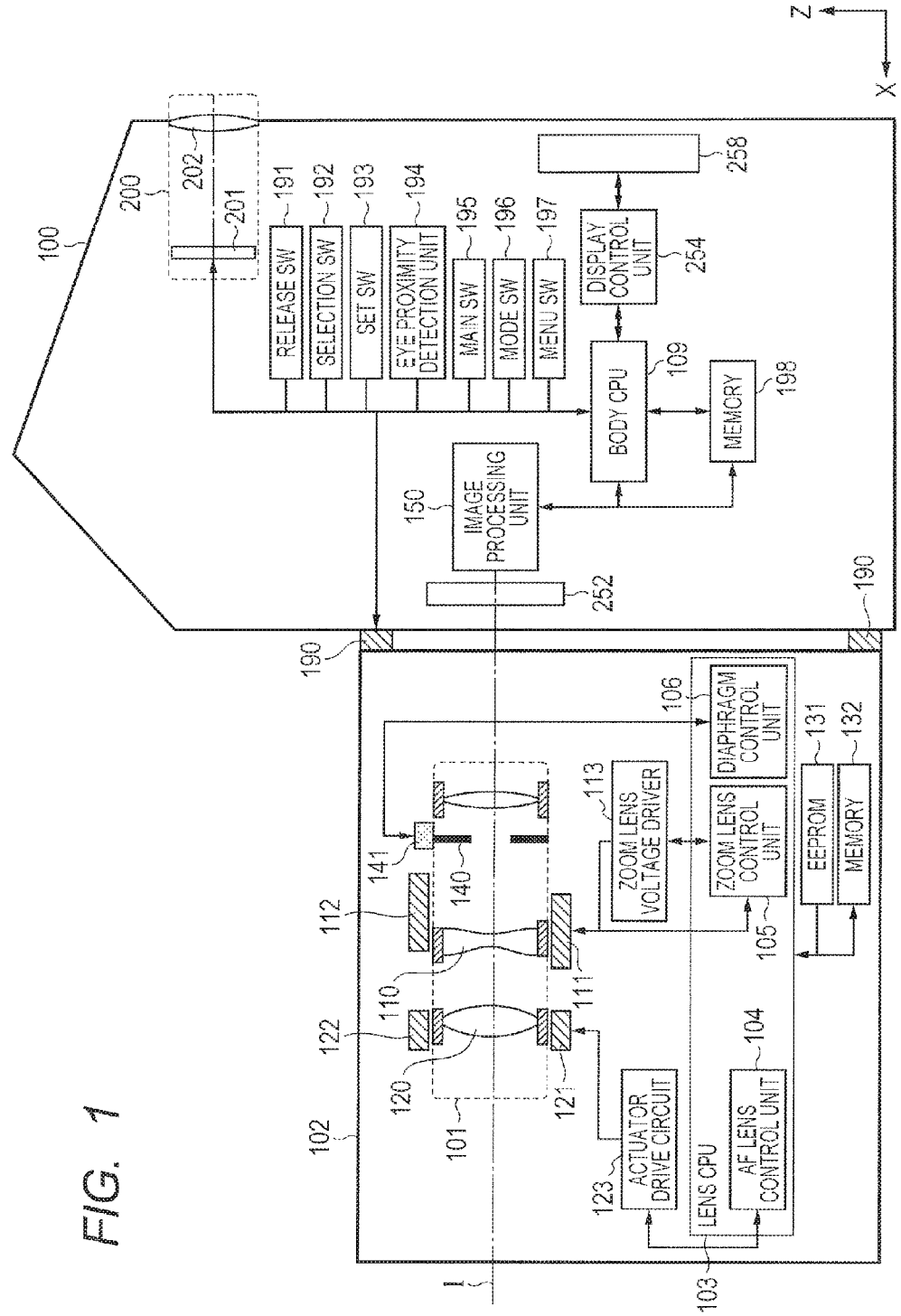
FIG. 1 is a block diagram for illustrating an image pickup apparatus according to a first embodiment of the present invention.
Figure 2:
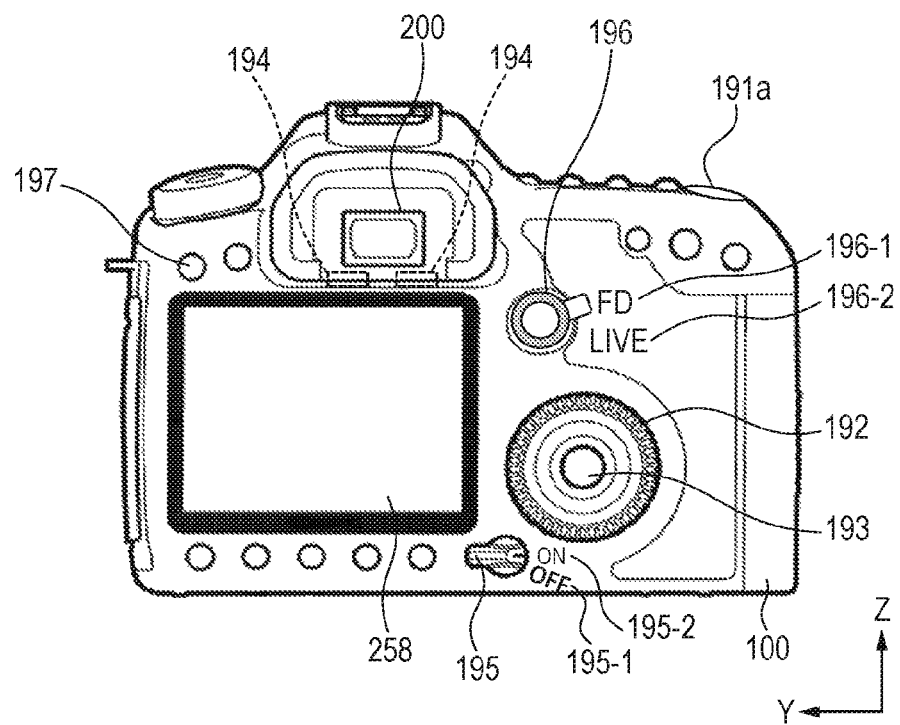
FIG. 2 is a rear view for illustrating the image pickup apparatus according to the first embodiment of the present invention.

An image pickup apparatus and a method of controlling the image pickup apparatus and a computer program according to a first embodiment of the present invention are described with reference to FIG. 1 to FIG. 8. FIG. 1 is a block diagram for illustrating an image pickup apparatus according to this embodiment. FIG. 2 is a rear view for illustrating the image pickup apparatus according to this embodiment.

As illustrated in FIG. 1, the image pickup apparatus (image pickup system) according to this embodiment includes a camera (body, image pickup apparatus body) 100 and a lens (lens device) 102. The camera 100 is, for example, a digital camera. The lens 102 is removably mounted on the camera 100.

The image pickup apparatus according to this embodiment includes an image pickup system, an image processing system, a recording and reproducing system, and a control system. The image pickup system includes, for example, a photography optical system 101 arranged in the lens 102 and an image pickup element 252 arranged in the camera 100. The image processing system includes, for example, an image processing unit 150 arranged in the camera 100. The recording and reproducing system includes, for example, a memory 198 arranged in the camera 100 and a display unit 258 arranged in the camera 100. The control system includes, for example, a body CPU 109 arranged in the camera 100 and a lens CPU 103 arranged in the lens 102. The control system further includes an actuator 121 configured to drive an autofocus (AF) lens 120 and an actuator drive circuit 123 configured to drive the actuator 121. Further, the control system includes a zoom lens drive unit 111 configured to drive a zoom lens 110 and a zoom lens voltage driver 113 configured to drive the zoom lens drive unit 111.

The image pickup system forms light from a material body (object) (not shown) into an image on an image pickup surface of the image pickup element 252 through the photography optical system 101. The photography optical system 101 includes the zoom lens 110. The zoom lens 110 can be driven in a direction of an optical axis I by the zoom lens drive unit 111 that uses an ultrasonic motor (not shown), a stepping motor (not shown), or the like as a drive source. A voltage for controlling the zoom lens drive unit 111 is input to the zoom lens drive unit 111 from the zoom lens voltage driver 113.

The position of the zoom lens 110 in the direction of the optical axis I is detected by a zoom position detection unit 112. The zoom position detection unit 112 is an encoder configured to detect the position of the zoom lens 110 in the direction of the optical axis I. The zoom position detection unit 112 outputs a pulse signal to a zoom lens control unit 105. The zoom lens control unit 105 can detect the position of the zoom lens 110 based on the pulse signal output from the zoom position detection unit 112.

The zoom lens control unit 105 controls the zoom lens drive unit 111 so that the zoom lens 110 is placed at, for example, a position on the optical axis I corresponding to a focal length set by a user with a switch (not shown). Note that, the switch configured to allow the user to set the focal length is provided, for example, in the camera 100 or the lens 102.

The zoom lens control unit 105 calculates a drive signal for driving the zoom lens 110 based on information on the position (target position) on the optical axis I corresponding to the focal length set by the user and information on a current position of the zoom lens 110. The drive signal having a digital value obtained by calculation is input to the zoom lens voltage driver 113 from the zoom lens control unit 105. The zoom lens voltage driver 113 controls the zoom lens driver 111 based on the drive signal output from the zoom lens control unit 105. Thus, the zoom lens 110 can be placed at the position on the optical axis I corresponding to the focal length set by the user.

Further, the photography optical system 101 includes the AF lens 120. The AF lens 120 can be driven in the direction of the optical axis I by the actuator 121 serving as a drive source. As the actuator 121, for example, an ultrasonic vibration unit is used. A voltage for driving the actuator 121 is input to the actuator 121 from the actuator drive circuit (vibrator drive circuit, driver) 123.

The position of the AF lens 120 in the direction of the optical axis I is detected through use of a focus position detection unit 122. The focus position detection unit 122 is an encoder configured to detect the position of the AF lens 120 in the direction of the optical axis I. The focus position detection unit 122 outputs a pulse signal to an AF lens control unit 104. The AF lens control unit 104 can detect the position of the AF lens 120 based on the pulse signal output from the focus position detection unit 122.

The AF lens control unit 104 controls the position of the AF lens 120 so that the AF lens 120 is placed at, for example, a position on the optical axis I corresponding to an object distance. Note that, an object position is detected, for example, when a release SW (release switch) 191 of the camera 100 is operated by the user.

The AF lens control unit 104 calculates a drive signal for driving the AF lens 120 based on information on the position (target position) on the optical axis I corresponding to the object distance and information on a current position of the AF lens 120. The drive signal having a digital value obtained by calculation is input to the actuator drive circuit 123 from the AF lens control unit 104. The actuator drive circuit 123 controls the actuator 121 based on the drive signal output from the AF lens control unit 104. Specifically, the actuator drive circuit 123 drives the actuator 121 by controlling frequencies and phases of AC voltages V1 and V2 to be applied to electrodes A1 and A2 arranged on a piezoelectric element 2 described later based on the drive signal output from the AF lens control unit 104. Thus, the AF lens 120 can be placed at the position on the optical axis I corresponding to the object distance.

The photography optical system 101 includes a diaphragm 140. The opening size of the diaphragm 140 is adjusted by a diaphragm drive unit 141 that uses a stepping motor or the like as a drive source. A signal for controlling the diaphragm drive unit 141 is input to the diaphragm drive unit 141 from a diaphragm control unit 106. The diaphragm control unit 106 calculates an aperture value for obtaining a proper exposure amount, for example, in accordance with the brightness of the object, calculates a drive signal for setting the opening size of the diaphragm 140 at an opening size corresponding to the aperture value, and outputs the drive signal obtained by calculation to the diaphragm drive unit 141.

The zoom lens control unit 105, the AF lens control unit 104, and the diaphragm control unit 106 are provided in the lens CPU 103. The lens CPU (lens-side controller) 103 is a central processing unit configured to perform various controls on the side of the lens 102. The lens CPU 103 can communicate to/from the body CPU (body-side controller) 109 via a lens contact point 190 formed between the lens 102 and the camera 100.

An EEPROM 131 is connected to the lens CPU 103. The EEPROM 131 is a nonvolatile storage unit configured to store lens data and the like that are various pieces of specific information on the lens 102. Further, a memory 132 is connected to the lens CPU 103.

The body CPU 109 is arranged in the camera 100. The body CPU (body-side controller) 109 is a central processing unit configured to perform various controls on the side of the camera 100 and also perform various controls of the entire image pickup apparatus.

Information is input to the body CPU 109 from the release SW 191, and the body CPU 109 can detect that the release SW has been pressed halfway or pressed completely. With this, the body CPU 109 performs the drive control of the image pickup element 252, the operation control of the image processing unit 150, compression processing of the memory 198, and the like. The body CPU 109 also controls the state of each segment displayed on a display unit (information display apparatus in a viewfinder) 201 arranged in a viewfinder 200.

The image processing unit 150 includes an A/D converter, a white balance circuit, a gamma correction circuit, an interpolation calculation circuit, and the like, and can generate an image for recording.

The image pickup element 252 is, for example, a complementary metal-oxide semiconductor (CMOS) image sensor that is a solid image pickup element using a CMOS. In the CMOS image sensor, a metal-oxide semiconductor (MOS) transistor of an area sensor unit and peripheral circuits, such as an image pickup apparatus drive circuit, an A/D conversion circuit, and an image processing circuit, can be formed in the same step. Therefore, the CMOS image sensor has a feature in that the number of masks and the number of process steps can be significantly reduced compared to those of a charge-coupled device (CCD) image sensor. The CMOS image sensor also has a feature of being able to randomly access any pixel. Thus, the CMOS image sensor can easily perform thinned reading for a display and perform a real-time display at a high display rate on the display unit 258.

The image pickup element 252 can perform a display image output operation of reading a part of a photo-receiving region of the image pickup element 252 in a thinned manner and a high-definition image output operation of reading the entire photo-receiving region of the image pickup element 252 through use of the above-mentioned features.

Further, in the image pickup element 252, as disclosed in, for example, Japanese Patent Application Laid-Open No. 2012-037777, pixels for detecting a focal point are arranged in the photo-receiving region. Thus, the body CPU 109 determines a defocus amount of a photographed image based on an object image formed on the image pickup element 252. Then, the body CPU 109 sends a signal in accordance with the determined defocus amount to the lens CPU 103 via the lens contact point 190, to thereby control the drive of the AF lens 120.

A signal from the release SW 191 is input to the body CPU 109. The release SW 191 is a switch configured to start a series of photography preparation operations, that is, a photometric operation, a focal point regulating operation (focus operation), and the like, through a halfway pressing operation of a release button 191a. Then, the release SW 191 is also a switch for starting a photography operation, that is, recording of image data read from the image pickup element 252 onto a recording medium through a complete pressing operation of the release button 191a. The halfway pressing of the release button 191a can be detected when a first switch (not shown) arranged in the release SW 191 is turned on. The complete pressing of the release button 191a can be detected when a second switch (not shown) arranged in the release SW 191 is turned on.

Further, a signal from a selection SW 192 is input to the body CPU 109. The selection SW 192 is a switch for selecting a setting item and a photography condition to be displayed by operating a menu SW 197 described later.

Further, a signal from a determination SW 193 is input to the body CPU 109. The determination SW 193 is a switch for determining a setting item menu or a setting value thereof to be displayed by operating a menu SW 197 described later.

Further, a signal from an eye proximity detection unit (detector) 194 (see FIG. 2) is input to the body CPU 109. The eye proximity detection unit 194 detects whether or not an eye of the user comes close to an eyepiece lens 202 of the viewfinder 200 described later.

Further, a signal from a main SW 195 is input to the body CPU 109. The main SW 195 is a switch for activating the camera 100. As illustrated in FIG. 2, the main SW 195 is a 2-position switch capable of selecting any one of two positions. A position 195-1 of the main SW 195 corresponds to "OFF", and in the case where the main SW 195 is set to the position 195-1, the camera 100 is put into a sleep state. A position 195-2 of the main SW 195 corresponds to "ON", and in the case where the main SW 195 is set to the position 195-2, the camera 100 is put into a driven state, thereby being capable of receiving various SW operations and performing operations for photographing a still image and a moving image.

Further, a signal from a mode SW 196 is input to the body CPU 109. The mode SW 196 is a switch for enabling the user to set a mode for observing the object, that is, an observation mode. As illustrated in FIG. 2, the mode SW 196 is a 2-position switch capable of selecting any one of two positions. As the observation mode, for example, there are given the following two observation modes. The first observation mode is a viewfinder mode, which is a mode for enabling the user to observe the object image displayed on the display unit 201 arranged in the viewfinder 200 through the eyepiece lens 202. The second observation mode is a live view mode, which is a mode for enabling the user to observe the object image displayed on the display unit 258 arranged separately from the viewfinder 200.

A position 196-1 of the mode SW 196 corresponds to a viewfinder mode and is denoted by letters "FD" indicating the viewfinder mode. In the case where the mode SW 196 is set to the position 196-1, the user can observe the object image through use of the viewfinder 200.

Meanwhile, a position 196-2 of the mode SW 196 corresponds to a live view mode and is denoted by letters "LIVE" indicating the live view mode. In the case where the mode SW 196 is set to the position 196-2, the user can observe the object image displayed on the display unit (observation unit) 258.

Further, a signal from the menu SW 197 is input to the body CPU 109. The menu SW 197 is a switch for performing a menu display for setting a photography condition and various operations of the camera 100 and the like. When the menu SW 197 is operated under a state in which the menu is not displayed on the display unit 258, the menu is displayed on the display unit 258. Meanwhile, when the menu SW 197 is operated under a state in which the menu is displayed on the displayed unit 258, the display unit 258 is put into a state in which the menu is not displayed.

The memory 198 arranged in the camera 100 is connected to the image processing unit 150 and the body CPU 109. The memory 198 records the object image or the like generated by the image processing unit 150. Further, the memory 198 stores setting values and the like required for the body CPU 109 to control the operation of the camera 100. Further, the memory 198 compresses an image, a moving image, a sound, and the like through use of a method determined in advance.

The viewfinder (observation unit) 200 includes the display unit 201 and the eyepiece lens 202 arranged in the viewfinder 200.

The object image formed on the image pickup element 252 is sent to the display unit 201 through the body CPU 109 and displayed on the display unit 201. The user can observe the object image enlarged by the eyepiece lens 202.

Note that, the viewfinder 200 may be an optical viewfinder, that is, a single-lens reflex optical viewfinder enabling the object image to be observed through use of a mirror (not shown) arranged between the photography optical system 101 and the image pickup element 252.

A display unit 258 is arranged on a back surface of the camera 100. The user can directly observe a display screen of the display unit 258. The body CPU 109 displays the object image formed on the image pickup element 252 on the display unit 258 through a display control unit 254. Further, when the menu SW 197 is operated, the body CPU 109 displays the menu on the display unit 258 through the display control unit 254. When the display unit 258 is configured through use of an organic EL spatial modulation element, a liquid crystal spatial modulation element, a spatial modulation element using electrophoresis of fine particles, or the like, the power consumption of the display unit 258 can be reduced, and the display unit 258 can be thinned. With this, the power saving and downsizing of the camera 100 can also be realized.

Figure 3A:
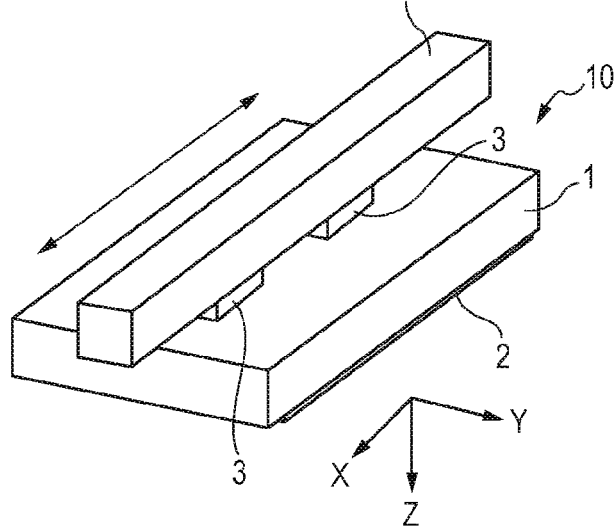
FIG. 3A and FIG. 3B are a perspective view and a plan view, respectively, for illustrating an actuator.
Figure 3B:
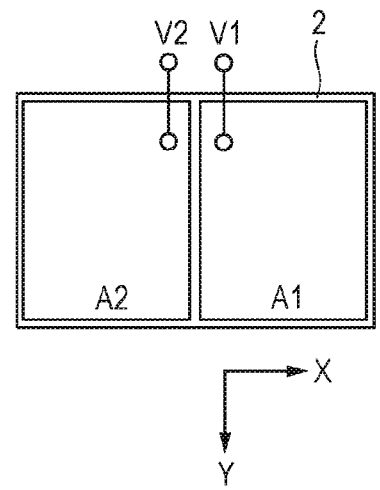

Next, the actuator 121 used in the image pickup apparatus according to this embodiment is described with reference to FIG. 3A to FIG. 6. FIG. 3A and FIG. 3B are a perspective view and a plan view, respectively, for illustrating a configuration of the actuator 121. FIG. 3A is a perspective view, and FIG. 3B is a plan view. Note that, the direction in which the vibrator 10 moves, that is, the direction of the optical axis I is defined as an X-direction. The direction in which the vibrator 10 is pressed against a slider 4 is defined as a Z-direction. The direction perpendicular to the X-direction and the Y-direction is defined as a Z-direction.

Figure 4A:
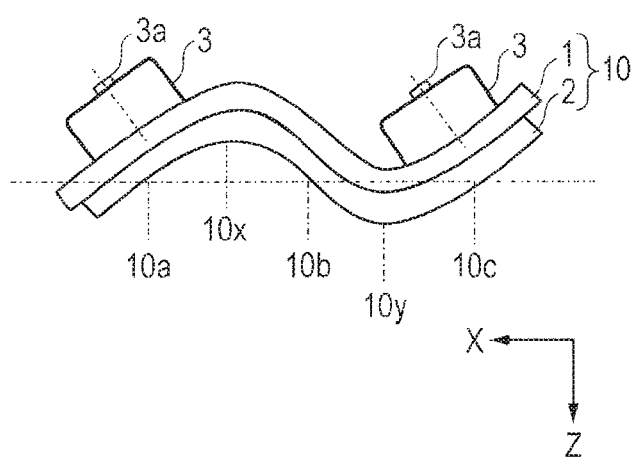
FIG. 4A and FIG. 4B are each a schematic view for illustrating an operation of a vibrator.
Figure 4B:
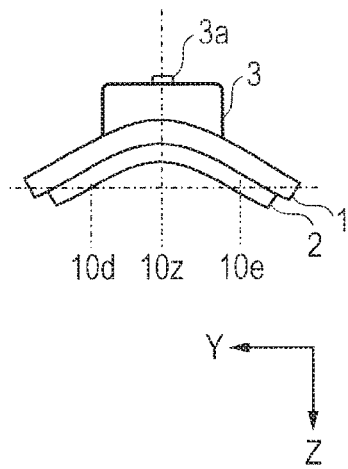

As illustrated in FIG. 3A, the vibrator 10 includes an elastic body (vibration plate) 1 formed of a metal and the piezoelectric element 2 connected to a back surface of the elastic body 1 through bonding or the like. A plurality of convex portions 3 are formed on one principal surface of the elastic body 1. As illustrated in FIG. 4A and FIG. 4B, a contact portion (protrusion) 3a that is brought into contact with the slider (friction member) 4 is formed on an apex of each convex portion 3.

The piezoelectric element 2 is subjected to polarization treatment. Two electrodes A1 and A2 are arranged on one principal surface of the piezoelectric element 2. When AC voltages V1 and V2 described later are applied to the electrodes A1 and A2, the piezoelectric element 2 is vibrated in a mode in accordance with the application mode of the AC voltages V1 and V2, to thereby vibrate the vibrator 10.

The vibration mode of the vibrator 10 is described below with reference to FIG. 4A and FIG. 4B. FIG. 4A and FIG. 4B are each a schematic view for illustrating an operation of the vibrator 10.

FIG. 4A is an illustration of vibration in a secondary bending vibration mode of the X-direction. When the AC voltages V1 and V2 of reverse phases are applied to the two electrodes A1 and A2 arranged on the piezoelectric element 2 of the vibrator 10, the vibration in the secondary bending vibration mode of the X-direction is excited in the vibrator 10, as illustrated in FIG. 4A. In FIG. 4A, there are illustrated node positions 10a, 10b, and 10c in the secondary bending vibration mode of the X-direction. There are also illustrated antinode positions 10x and 10y in the secondary bending vibration mode of the X-direction. In the secondary bending vibration mode of the X-direction, the node positions 10a, 10b, and 10c are not greatly displaced in the Z-direction, but a normal direction of a surface of the vibrator 10 at the node positions 10a, 10b, and 10c is greatly displaced. Therefore, in the secondary bending vibration mode of the X-direction, the contact portions 3a positioned at the apexes of the convex portions 3 arranged at the node positions 10a and 10c do not vibrate with large amplitude in the Z-direction but vibrate with large amplitude in the X-direction. Thus, in this embodiment, the convex portions 3 are arranged at the node positions 10a and 10c in the secondary bending vibration mode of the X-direction, and hence large vibration in the X-direction occurs in the contact portions 3a. Such a mode is called a feed mode.

FIG. 4B is an illustration of vibration in a primary bending vibration mode of the Y-direction. When AC voltages V1 and V2 of the same phase are applied to the two electrodes A1 and A2 arranged on the piezoelectric element 2 of the vibrator 10, the vibration in the primary bending vibration mode of the Y-direction is excited in the vibrator 10, as illustrated in FIG. 4B. In FIG. 4B, there are illustrated node positions 10d and 10e in the primary bending vibration mode of the Y-direction. There is also illustrated an antinode position 10z in the primary bending vibration mode of the Y-direction. In the primary bending vibration mode of the Y-direction, the node positions 10d and 10e are not greatly displaced in the Z-direction, but the antinode position 10z is greatly displaced in the Z-direction. Therefore, in the primary bending vibration mode of the Y-direction, the contact portion 3a positioned at the apex of the convex portion 3 arranged at the antinode position 10z vibrates with large amplitude in the Z-direction. Thus, in this embodiment, the convex portion 3 is arranged at the antinode position 10z in the primary bending vibration mode of the Y-direction, and hence large vibration in the Z-direction occurs in the contact portion 3a. The contact portion 3a greatly vibrates in the Z-direction, and hence water aggregated at a contact position between the contact portion 3a and the slider 4 is eliminated reliably. Such a mode is called a push-up mode.

Figure 5:
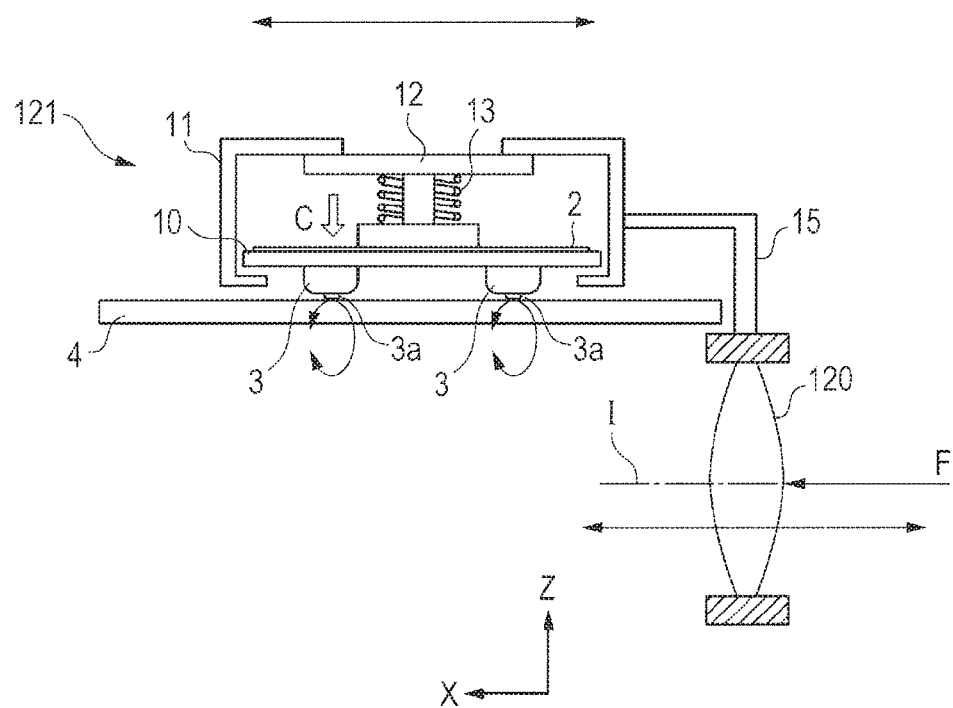
FIG. 5 is a view for illustrating the actuator and an AF lens, and a connection member configured to connect the actuator and the AF lens to each other.

When the primary bending vibration mode and the secondary bending vibration mode are combined, elliptic motion is excited in the contact portions 3a, as illustrated in FIG. 5. The contact portions 3a are brought into pressure-contact with the slider 4, and hence the vibrator 10 can be driven in one direction (X-direction in FIG. 5) with respect to the slider 4.

When the frequencies of the AC voltages V1 and V2 to be applied to the electrodes A1 and A2 arranged on the piezoelectric element 2 are changed, the size of an ellipse can be changed while an elliptic ratio of the elliptic motion is maintained. When the frequencies of the AC voltages V1 and V2 to be applied to the electrodes A1 and A2 arranged on the piezoelectric element 2 are brought close to a resonance frequency fr of the vibrator 10, the size of the ellipse of the elliptic motion of the contact portion 3a increases, and hence the drive speed of the vibrator 10 increases. Meanwhile, when the frequencies of the AC voltages V1 and V2 to be applied to the electrodes A1 and A2 arranged on the piezoelectric element 2 are brought away from the resonance frequency fr, the size of the ellipse of the elliptic motion of the contact portion 3a decreases, and hence the drive speed of the vibrator 10 decreases.

When the phase difference between the AC voltages V1 and V2 to be applied to the electrodes A1 and A2 arranged on the piezoelectric element 2 is changed, the elliptic ratio of the elliptic motion of the contact portion 3a can be changed. In the case where the phase difference between the AC voltages V1 and V2 is 0 degrees, the AC voltages V1 and V2 of the same phase are applied to the two electrodes A1 and A2 arranged on the piezoelectric element 2, and hence the vibration in the primary bending vibration mode of the Y-direction, that is, the vibration in the push-up mode is excited in the vibrator 10. In the case where the phase difference between the AC voltages V1 and V2 is 180 degrees, the AC voltages V1 and V2 of the reverse phases are applied to the two electrodes A1 and A2 arranged on the piezoelectric element 2, and hence the vibration in the secondary bending vibration mode of the X-direction, that it, the vibration in the feed mode is excited in the vibrator 10. Then, in the case where the phase difference between the AC voltages V1 and V2 is from 0 degrees to 180 degrees, the ratio between the amplitude in the Z-direction that corresponds to the push-up mode and the amplitude in the X-direction that corresponds to the feed mode vary depending on the magnitude of the phase difference between the AC voltages V1 and V2. With this, elliptic motion having an elliptic ratio in accordance with the phase difference between the AC voltages V1 and V2 is excited in the contact portion 3a.

FIG. 5 is a view for illustrating the actuator and an AF lens, and a connection member configured to connect the actuator and the AF lens to each other.

The actuator 121 includes the vibrator 10, a holding unit (movable body) 11 configured to indirectly hold the vibrator 10 through intermediation of a pressurizing member 12 and an energizing member 13, the pressurizing member 12 configured to pressurize the vibrator 10 via the energizing member 13, and the energizing member 13 configured to bias the vibrator 10.

As the energizing member 13, a compression spring or the like is used. The pressurizing member 12 pressurizes the vibrator 10 via the energizing member 13 in a direction of the arrow C of FIG. 5. The vibrator 10 is pressurized by the energizing member 13, and hence the vibrator 10 is brought into pressure-contact with the slider 4. More specifically, the contact portion 3a positioned at the apex of the convex portion 3 formed on the vibrator 10 is brought into pressure-contact with the slider 4. The vibrator 10 is brought into pressure-contact with the slider 4, and hence the position of the actuator 121 is held by the friction force between the vibrator 10 and the slider 4. The friction force for holding the position of the actuator 121 is also referred to as holding force.

The vibrator 10 is in pressure-contact with the slider 4. Therefore, through application of the AC voltages V1 and V2 having desired frequencies and phase difference to the electrodes A1 and A2 arranged on the piezoelectric element 2 of the vibrator 10, the actuator 121 can be driven in the X-direction, that is, the direction of the optical axis I.

As illustrated in FIG. 5, the AF lens 120 is connected to the actuator 121 through intermediation of a connection member 15. Therefore, when the actuator 121 is driven in the direction of the optical axis I, the AF lens 120 is also driven in the direction of the optical axis I in the same way as in the actuator 121.

While the actuator 121 is suspended, the actuator 121 is fixed to the slider 4 through the holding force (friction force). Therefore, even when external force F is applied to the AF lens 120, the AF lens 120 does not move.

Figure 6:
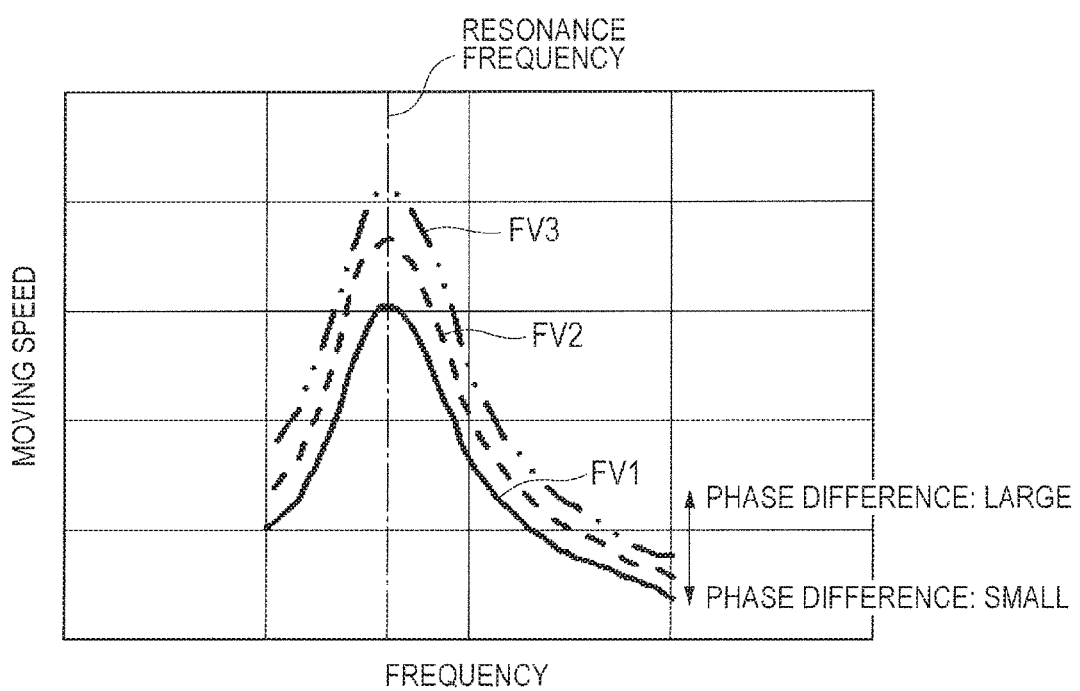
FIG. 6 is a graph for showing a relationship among frequencies of AC voltages to be applied to electrodes arranged on a piezoelectric element, a phase difference between the AC voltages, and a moving speed of the actuator.

FIG. 6 is a graph for showing a relationship among frequencies of the AC voltages to be applied to the electrodes arranged on the piezoelectric element, a phase difference between the AC voltages, and a moving speed of the actuator. The horizontal axis represents the frequency of the AC voltages V1 and V2 to be applied to the electrodes A1 and A2 arranged on the piezoelectric element 2. The vertical axis represents the moving speed of the actuator 121. The alternate long and short dash line indicates the resonance frequency of the vibrator 10. FV1 indicates the case where the phase difference between the AC voltages V1 and V2 is set to be relatively small. FV2 indicates the case where the phase difference between the AC voltages V1 and V2 is set to be an intermediate degree. FV3 indicates the case where the phase difference between the AC voltages V1 and V2 is set to be relatively large.

As is understood from FIG. 6, as the frequencies of the AC voltages V1 and V2 to be applied to the electrodes A1 and A2 arranged on the piezoelectric element are brought closer to the resonance frequency of the vibrator 10, the moving speed of the actuator 121 increases.

Further, as the phase difference between the AC voltages V1 and V2 to be applied to the electrodes A1 and A2 arranged on the piezoelectric element 2 is increased, the moving speed of the actuator 121 increases.

In the case where characteristics as indicated by FV1 are obtained when the phase difference between the AC voltages V1 and V2 to be applied to the electrodes A1 and A2 arranged on the piezoelectric element 2 is, for example, degrees, when the phase difference between the AC voltages V1 and V2 is increased, characteristics as indicated by FV2 are obtained. Then, when the phase difference between the AC voltages V1 and V2 is further increased, characteristics as indicated by FV3 are obtained.

The actuator drive circuit 123 appropriately controls the frequencies and phase difference of the AC voltages V1 and V2 to be applied to the electrodes A1 and A2 arranged on the piezoelectric element 2 based on a drive signal from the AF lens control unit 104, to thereby drive the actuator 121.

Figure 7:
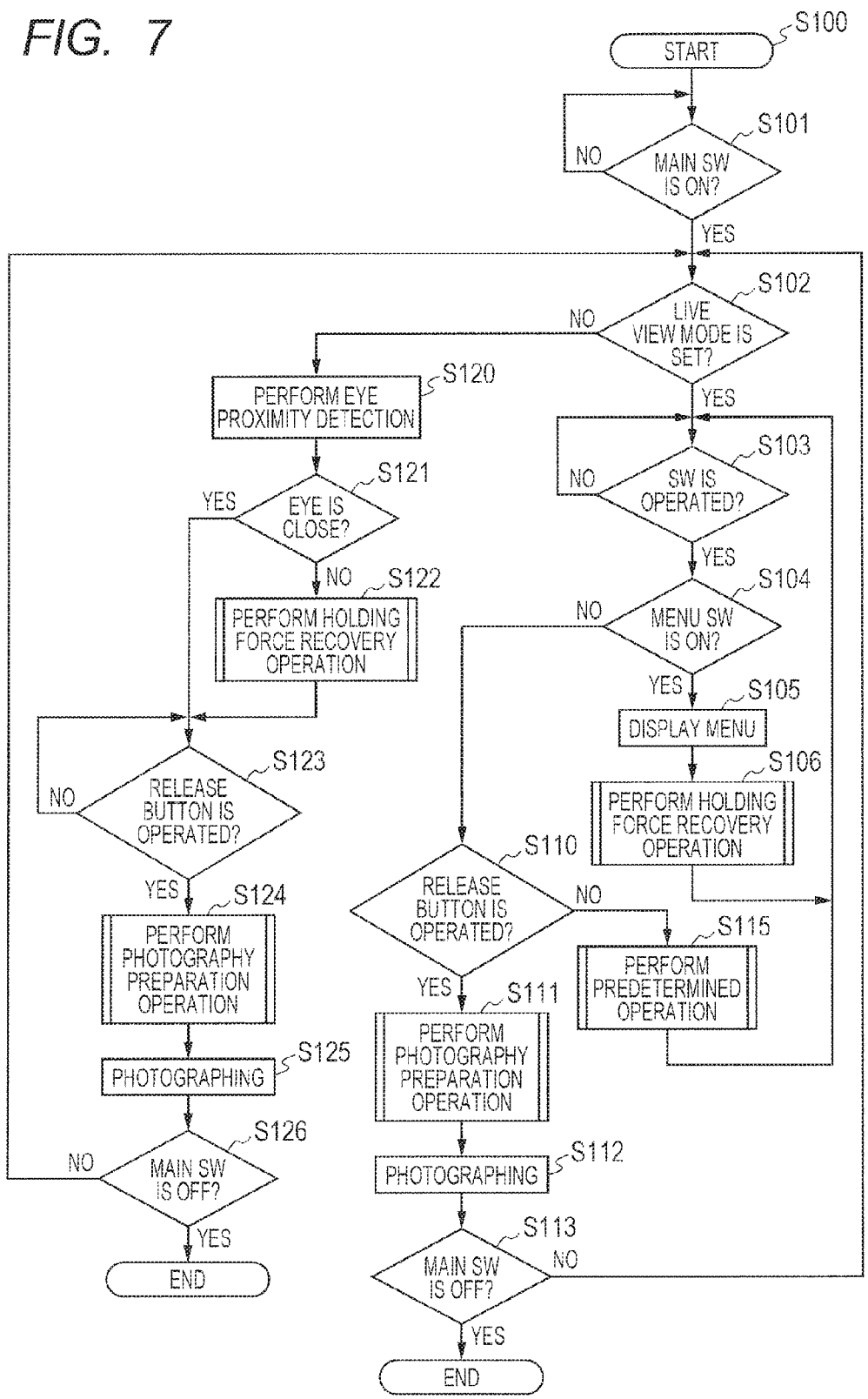
FIG. 7 is a flowchart for illustrating a main flow of an operation of the image pickup apparatus according to the first embodiment of the present invention.
Figure 8:
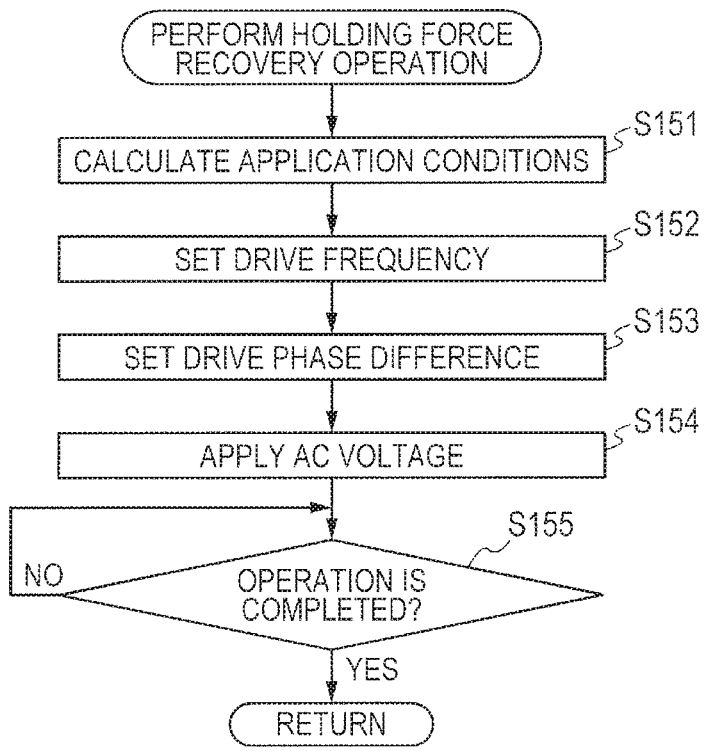
FIG. 8 is a flowchart for illustrating a holding force recovery operation.

Next, the operation of the image pickup apparatus according to this embodiment is described with reference to FIG. 7 and FIG. 8. FIG. 7 is a flowchart for illustrating a main flow of the operation of the image pickup apparatus according to this embodiment.

First, the body CPU 109 determines whether or not the main SW 195 is ON (Step S101). In the case where the main SW 195 is not ON (NO in Step S101), Step S101 is repeated. In the case where the main SW 195 is turned on (YES in Step S101), the flow proceeds to Step S102.

In Step S102, the body CPU 109 detects a mode in which a user observes an object, that is, an observation mode. The observation mode is set by the mode SW 196 as described above. In the case where the observation mode is set to a live view mode (YES in Step S102), the flow proceeds to Step S103. Meanwhile, in the case where the observation mode is set to a viewfinder mode (NO in Step S102), the flow proceeds to Step S120.

In Step S103, the body CPU 109 determines whether or not input operations of various switches, such as the release SW 191, have been performed. In the case where the input operations of various switches have not been performed (NO in Step S103), Step S103 is repeated. In the case where the input operation of any of the switches has been operated by the user (YES in Step S103), the flow proceeds to Step S104.

In Step S104, the body CPU 109 determines whether or not the input operation of the switch performed in Step S103 is the operation of the menu SW 197 for turning on a menu display. In the case where the input operation for turning on the menu display has been performed through use of the menu SW 197 (YES in Step S104), the body CPU 109 displays a menu on the display unit 258 through the display control unit 254 (Step S105). Specifically, the menu for performing setting of a photography condition and various operations of the camera 100 and the like is displayed on the display unit 258.

Then, under a state in which the menu is displayed on the display unit 258, the operation of recovering holding force of the actuator 121, that is, a holding force recovery operation (Step S106) which is an operation for maintenance of the actuator 121 is performed. Note that, the detail of the holding force recovery operation is described later with reference to FIG. 8.

In this embodiment, the holding force recovery operation is performed under a state in which the menu is being displayed for the following reason. Specifically, in the live view mode, an image of an object is generally displayed on the display unit 258, but the image of the object is not displayed on the display unit 258 under a state in which the menu is being displayed on the display unit 258. Therefore, even when the AF lens 120 has moved along with the holding force recovery operation of the actuator 121, the influence by the movement of the AF lens 120 does not appear on an image to be displayed on the display unit 258 when the menu is being displayed on the display unit 258. Thus, even when the AF lens 120 has moved along with the holding force recovery operation, the user does not recognize through the display unit 258 that the AF lens 120 has moved, and the user does not misunderstand that the image pickup apparatus has a defect. For this reason, in this embodiment, in the live view mode, the holding force recovery operation of the actuator 121 is performed when the menu is being displayed on the display unit 258.

As described above, in this embodiment, in the live view mode, the holding force recovery operation is performed when the image of the object is not displayed on the display unit 258. After the holding force recovery operation is completed, the flow returns to Step S103.

In the case where the operation of the switch in Step S103 is the operation of the menu SW 197 for turning off the menu display, or in the case where the operation of the switch in Step S103 is the operation of the switch other than the menu SW 197 (NO in Step S104), the flow proceeds to Step S110.

In Step S110, the body CPU 109 determines whether or not the operation of the switch performed in Step S103 is the operation using the release button 191a (Step S110). The operation using the release button 191a can be detected based on the state of the release SW 191 arranged on the release button 191a. In the case where the operation of the switch performed in Step S103 is the operation using the release button 191a (YES in Step S110), the flow proceeds to Step S111.

In Step S111, a photography preparation operation (first operation) that is an operation of preparing photography is performed. Specifically, a photometric operation, a distance measuring operation, and the like are performed, and the opening size of the diaphragm 140 is controlled based on the results of the photometric operation, and the drive of the AF lens 120 by the actuator 121, that is, the focus operation is performed based on the results of the distance measuring operation.

Figure 9:
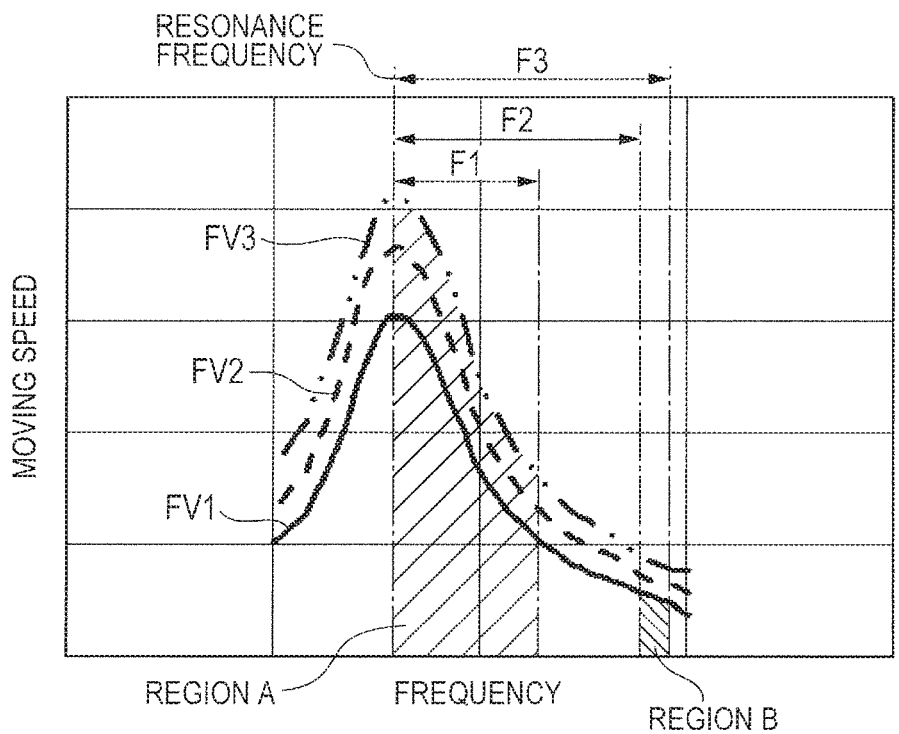
FIG. 9 is a graph for showing application conditions of AC voltages applied at time of driving the actuator and application conditions of AC voltages applied at time of performing the holding force recovery operation.

When the actuator 121 is driven so as to adjust the position of the AF lens 120, the frequencies and phase difference of the AC voltages V1 and V2 to be applied to the electrodes A1 and A2 arranged on the piezoelectric element 2 are appropriately set. FIG. 9 is a graph for showing application conditions of AC voltages applied at time of driving the actuator and application conditions of AC voltages applied at time of performing the holding force recovery operation. The horizontal axis represents the frequencies of the AC voltages V1 and V2 to be applied to the electrodes A1 and A2 arranged on the piezoelectric element 2. The vertical axis represents the moving speed of the actuator 121. The alternate long and short dash line indicates the resonance frequency of the vibrator 10. FV1 indicates the case where the phase difference between the AC voltages V1 and V2 is set to be relatively small. FV2 indicates the case where the phase difference between the AC voltages V1 and V2 is set to be an intermediate degree. FV3 indicates the case where the phase difference between the AC voltages V1 and V2 is set to be relatively large. A region A indicates an example of the application conditions of the AC voltages V1 and V2 applied at time of performing the photography preparation operation (first operation), that is, at time of driving the actuator 121 so as to adjust the position of the AF lens 120 (focus operation). A region B indicates an example of the application conditions of the AC voltages V1 and V2 applied at time of performing the holding force recovery operation (second operation).

In the case where the actuator 121 is driven so as to adjust the position of the AF lens 120, the frequencies of the AC voltages V1 and V2 to be applied to the electrodes A1 and A2 arranged on the piezoelectric element 2 are set, for example, within a range of from (fr) to (fr+F1) as shown in FIG. 9. Note that, as described above, fr denotes the resonance frequency of the vibrator 10. The actuator 121 can be appropriately driven at a desired speed by appropriately setting the frequencies of the AC voltages V1 and V2 to be applied to the electrodes A1 and A2 within a range of from (fr) to (fr+F1) and appropriately setting the phase difference between the AC voltages V1 and V2. After the adjustment of the position of the AF lens 120 is completed, that is, after the photography preparation operation (first operation) is completed, the flow proceeds to Step S112.

In Step S112, a photography operation is performed. Note that, the photography operation itself is a known operation, and hence the detailed description thereof is omitted here. After the photography operation is completed, the flow proceeds to Step S113.

In Step S113, the body CPU 109 determines whether or not the main SW 195 has been turned off. In the case where the main SW 195 remains turned on (NO in Step S113), the flow returns to Step S102, and a flow of a series of operations is repeated. Meanwhile, in the case where the main SW 195 has been turned off (YES in Step S113), the power source of the camera 100 is turned off, and the flow of a series of operations is finished.

In the case where the operation of the switch performed in Step S103 is the operation of the switch other than the menu SW 197 (NO in Step S104) and is not the operation using the release button 191a (No in Step S110), the flow proceeds to Step S115.

In Step S115, a predetermined operation is performed based on the operation of the switch performed in Step S103, and the flow returns to Step S103.

In the case where the mode in which the user observes the object, that is, the observation mode is not the live view mode (NO in Step S102), that is, in the case where the observation mode is the viewfinder mode, the flow proceeds to Step S120.

In Step S120, the eye proximity detection unit (detector) 194 detects whether or not the eye of the user is close to the eyepiece lens 202 of the viewfinder 200. After that, the flow proceeds to Step S121.

In the case where the eye of the user is not close to the eyepiece lens 202 of the viewfinder 200 (NO in Step S121), the flow proceeds to Step S122.

In Step S122, a holding force recovery operation (second operation) of the actuator 121 is performed. Note that, the detail of the holding force recovery operation is described later with reference to FIG. 8.

In the case where the observation mode is the viewfinder mode, the holding force recovery operation is performed for the following reason when the eye of the user is not close to the eyepiece lens 202 of the viewfinder 200. Specifically, in the viewfinder mode, the user confirms the image of the object by bringing the eye close to the eyepiece lens 202 of the viewfinder 200. Thus, in the case where the eye of the user is not close to the eyepiece lens 202 of the viewfinder 200, it can be presumed that the user does not gaze at the image of the object. In the case where the user does not gaze at the image of the object, even when the AF lens 120 has moved along with the holding force recovery operation of the actuator 121, the user does not recognize that the AF lens 120 has moved. Therefore, even when the AF lens 120 has moved along with the holding force recovery operation, the user does not misunderstand that the image pickup apparatus has a defect. For this reason, in this embodiment, in the viewfinder mode, the holding force recovery operation is performed when the eye of the user is not close to the eyepiece lens 202 of the viewfinder 200. After the holding force recovery operation is completed, the flow proceeds to Step S123.

In the case where the eye of the user is close to the eyepiece lens 202 of the viewfinder 200 (YES in Step S121), the flow proceeds to Step S123.

In Step S123, the body CPU 109 determines whether or not the operation using the release button 191a has been performed. The operation using the release button 191a can be detected based on the state of the release SW 191 arranged on the release button 191a. In the case where the operation using the release button 191a has not been performed (NO in Step S123), the flow is put into a standby state until the operation using the release button 191a is performed. In the case where the operation using the release button 191a has been performed (YES in Step S123), the flow proceeds to Step S124.

In Step S124, a photography preparation operation that is an operation of preparing photography is performed. The photography preparation operation is the same as that in Step S111 described above, and hence the description thereof is omitted. After that, the flow proceeds to Step S125.

In Step S125, a photography operation is performed. Note that, the photography operation is known as described above, and hence the detailed description thereof is omitted here. After that, the flow proceeds to Step S126.

In Step S126, the body CPU 109 determines whether or not the main SW 195 has been turned off. In the case where the main SW 195 remains turned on (NO in Step S126), the flow returns to Step S102, and a flow of a series of operations is repeated. Meanwhile, in the case where the main SW 195 has been turned off (YES in Step S126), the power source of the camera 100 is turned off, and the flow of a series of operations is finished.

Next, the holding force recovery operation (second operation), that is, the operation for maintenance of the actuator 121 is described with reference to FIG. 8. FIG. 8 is a flowchart for illustrating the holding force recovery operation.

First, the body CPU 109 calculates the application conditions, that is, the frequencies and phase difference of the AC voltages V1 and V2 to be applied to the electrodes A1 and A2 arranged on the piezoelectric element 2 of the actuator 121 (Step S151). The application conditions of the AC voltages V1 and V2 to be applied to the electrodes A1 and A1 at time of performing the holding force recovery operation are determined, for example, so as to fall within the range of the region B illustrated in FIG. 9. Specifically, the frequencies of the AC voltages V1 and V2 to be applied to the electrodes A1 and A2 are determined so as to fall within, for example, a range of from (fr+F2) to (fr+F3). Further, the phase difference between the AC voltages V1 and V2 to be applied to the electrodes A1 and A2 are determined so that the relationship between the frequencies of the AC voltages V1 and V2 and the moving speed of the actuator 121 becomes FV1 or less. F2 is sufficiently larger than F1. F3 is larger than F2. That is, the frequencies of the region B that are the application conditions of the AC voltages V1 and V2 at time of performing the holding force recovery operation are sufficiently higher than those of the region A that are the application conditions of the AC voltages V1 and V2 at time of performing the photography preparation operation.

The frequencies of the AC voltages V1 and V2 to be applied to the electrodes A1 and A2 at time of performing the holding force recovery operation are set to be relatively high for the following reason. Specifically, when the frequencies of the AC voltages V1 and V2 to be applied to the electrodes A1 and A2 at time of performing the holding force recovery operation are set to be high, the frequency of contact between the contact portion 3a of the actuator 121 and the slider 4 can be increased. When the contact number between the contact portion 3a of the actuator 121 and the slider 4 is increased, water aggregated at a contact position between the contact portion 3a of the actuator 121 and the slider 4 can be eliminated reliably. For this reason, in this embodiment, the frequencies of the AC voltages V1 and V2 to be applied to the electrodes A1 and A2 at time of performing the holding force recovery operation are set to be relatively high.

Thus, the application conditions of the AC voltages V1 and V2 to be applied to the electrodes A1 and A2 arranged on the piezoelectric element 2 of the actuator 121 are calculated. After that, the flow proceeds to Step S152.

In Step S152, the frequencies, that is, drive frequencies of the AC voltages V1 and V2 to be applied to the electrodes A1 and A2 of the piezoelectric element 2 are set in accordance with the calculation results in Step S151, and values of the drive frequencies are output to the AF lens control unit 104 arranged in the lens CPU 103. The AF lens control unit 104 outputs the values of the drive frequencies to the actuator drive circuit 123. After that, the flow proceeds to Step S153.

In Step S153, the phase difference, that is, the drive phase difference of the AC voltages V1 and V2 to be applied to the electrodes A1 and A2 of the piezoelectric element 2 is set in accordance with the calculation results in Step S151, and a value of the drive phase difference is output to the AF lens control unit 104 arranged in the lens CPU 103. The AF lens control unit 104 outputs the value of the drive phase difference to the actuator drive circuit 123. After that, the flow proceeds to Step S154.

In Step S154, the actuator drive circuit 123 applies the AC voltages V1 and V2 to the electrodes A1 and A2 of the piezoelectric element 2 of the actuator 121 based on the drive frequencies set in Step S152 and the drive phase difference set in Step S153. With this, the actuator 121 moves at a predetermined speed. Along with this, the water aggregated at a contact position between the contact portion 3a of the actuator 121 and the slider 4 is eliminated by vibration, and the holding force (friction force) is recovered. The holding force is recovered, and hence the AF lens 120 does not move even when the external force F is applied to the AF lens 120. Therefore, an out-of-focus problem caused by the movement of the AF lens 120 can be prevented.

In Step S155, the body CPU 109 determines whether or not the holding force recovery operation is completed. In the case where the holding force recovery operation is not completed (NO in Step S155), the application of the AC voltages V1 and V2 to the electrodes A1 and A2 arranged on the piezoelectric element 2 continues. Meanwhile, in the case where the holding force recovery operation is completed (YES in Step S155), the flow returns to the main flow illustrated in FIG. 7.

As described above, according to this embodiment, when the eye proximity detection unit 194 detects that the user does not observe the object through use of the viewfinder 200, the holding force recovery operation of the actuator 121 is performed. Further, according to this embodiment, when the image of the object is not displayed on the display unit 258, the holding force recovery operation of the actuator 121 is performed. Therefore, even when the AF lens 120 has moved along with the holding force recovery operation, the user does not recognize that the AF lens 120 has moved, and the user does not misunderstand that the image pickup apparatus has a defect. Therefore, according to this embodiment, the image pickup apparatus can be provided, which is capable of maintaining satisfactory performance while preventing the user from misunderstanding that the image pickup apparatus has a defect.

Second Embodiment

Figure 10:
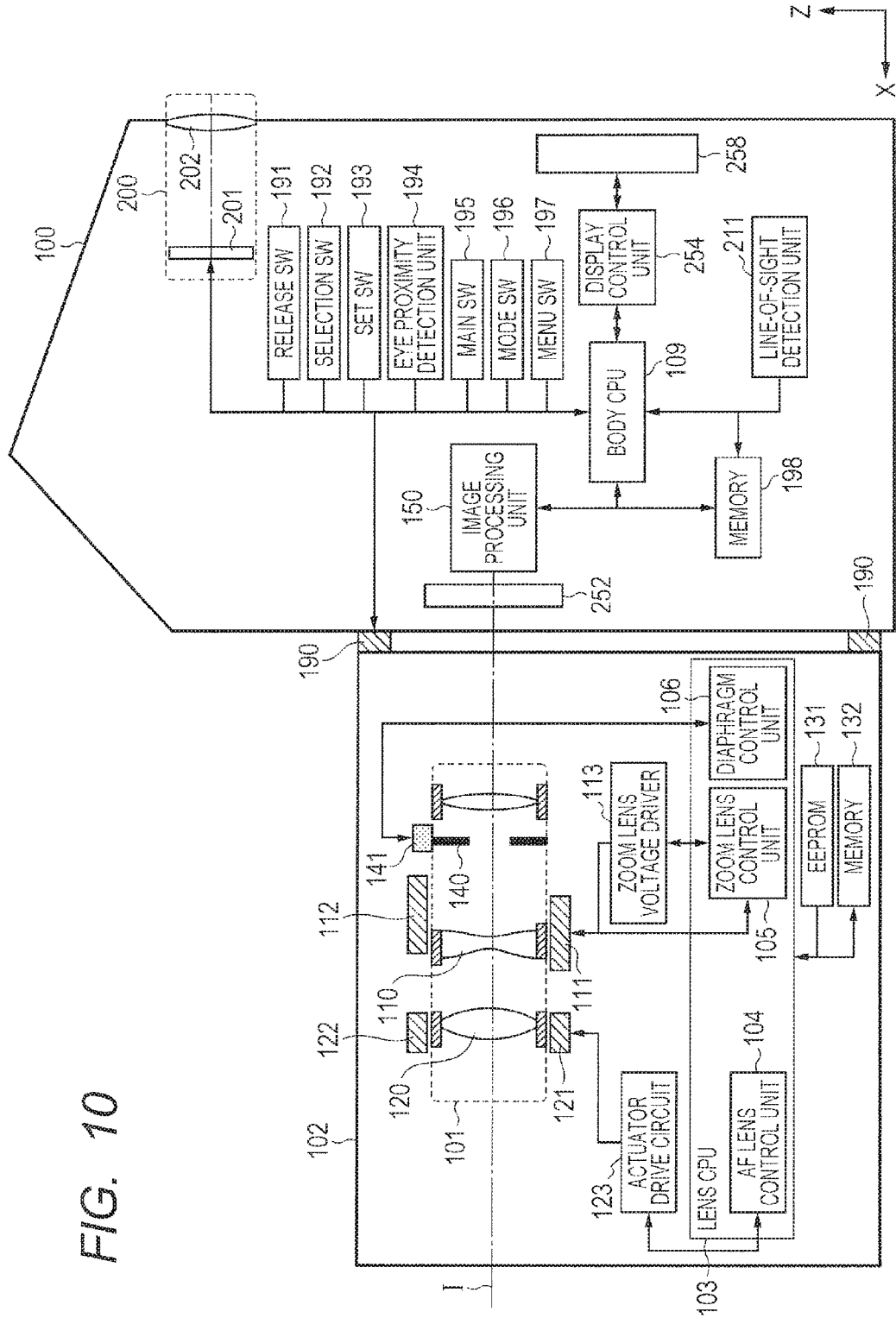
FIG. 10 is a block diagram for illustrating an image pickup apparatus according to a second embodiment of the present invention.
Figure 11:
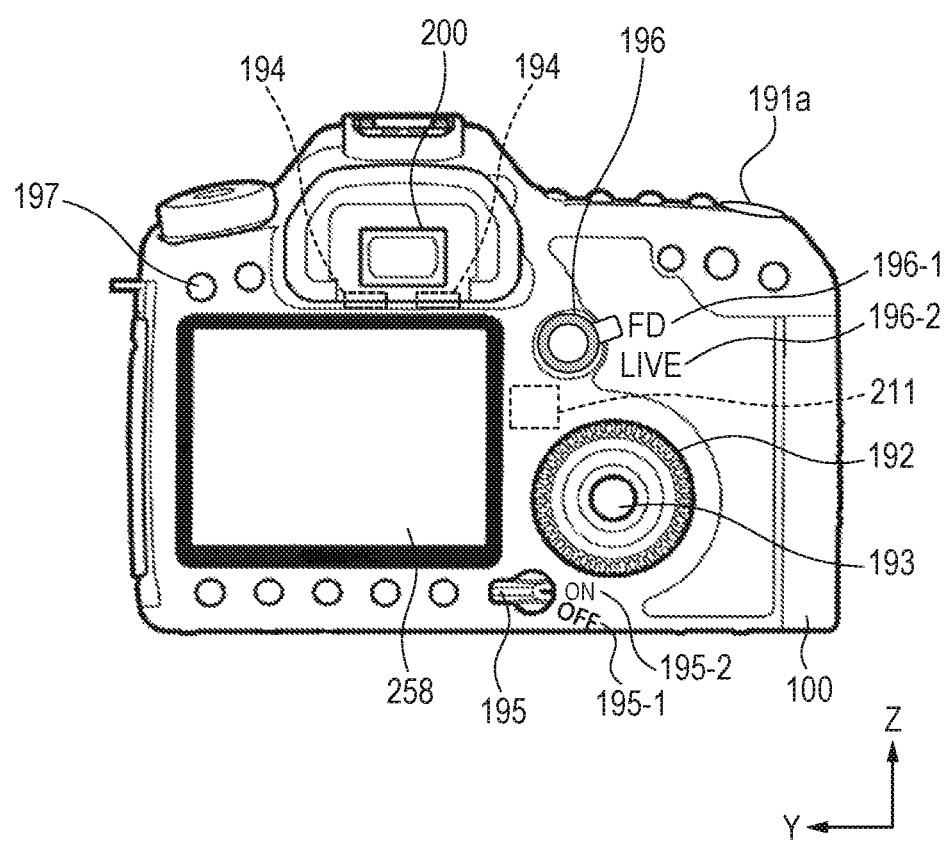
FIG. 11 is a rear view for illustrating the image pickup apparatus according to the second embodiment of the present invention.
Figure 12:
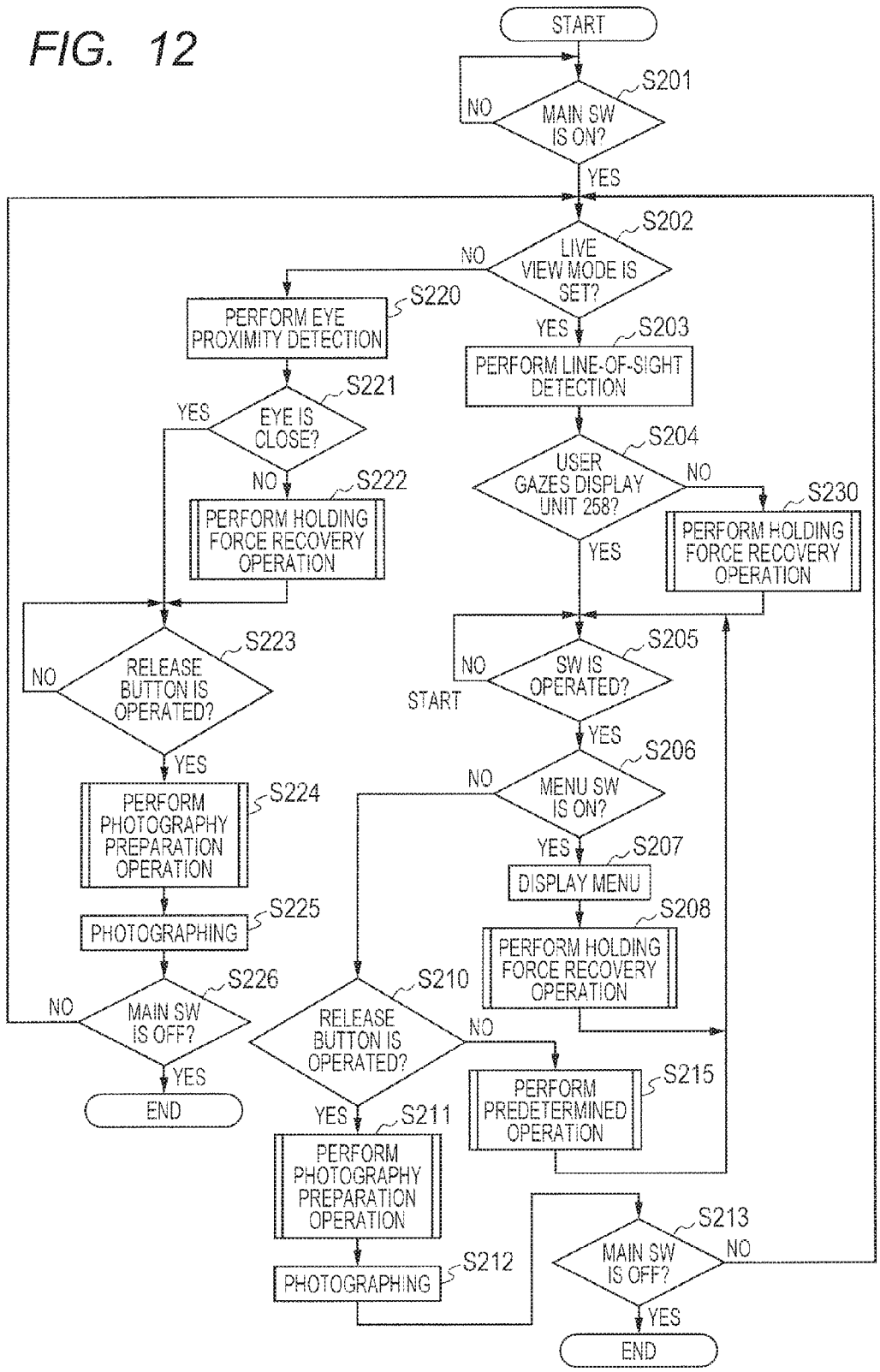
FIG. 12 is a flowchart for illustrating a main flow of an operation of the image pickup apparatus according to the second embodiment of the present invention.

An image pickup apparatus and a method of controlling the image pickup apparatus and a computer program according to a second embodiment of the present invention are described with reference to FIG. 10 to FIG. 12. FIG. 10 is a block diagram for illustrating the image pickup apparatus according to this embodiment. FIG. 11 is a rear view for illustrating the image pickup apparatus according to this embodiment. The same components as those of the image pickup apparatus according to the first embodiment illustrated in FIG. 1 to FIG. 9 are denoted by the same reference symbols as those therein, and the descriptions thereof are omitted or simplified.

In the image pickup apparatus according to this embodiment, a line-of-sight detection unit 211 configured to detect a line of sight of the user is arranged in the camera 100.

As illustrated in FIG. 11, the line-of-sight detection unit (detector) 211 is arranged on a back surface side of the camera 100. As illustrated in FIG. 10, the output from the line-of-sight detection unit 211 is input to the body CPU 109. The line-of-sight detection unit 211 is formed of, for example, a CCD camera. The line-of-sight detection unit 211 is arranged, for example, in the vicinity of the display unit 258. According to this embodiment, the line-of-sight detection unit 211 configured to detect a line of sight of the user is arranged, and hence it is possible to detect which portion of the camera 100 the user gazes at.

Next, the operation of the image pickup apparatus according to this embodiment is described with reference to FIG. 12. FIG. 12 is a flowchart for illustrating the main flow of the operation of the image pickup apparatus according to this embodiment.

First, Step S201 and Step S202 are the same as Step S101 and Step S102 described above in the first embodiment, and hence the descriptions thereof are omitted. In the case where the observation mode is set to a live view mode (YES in Step S202), the flow proceeds to Step S203.

In Step S203, the line-of-sight detection unit 211 performs line-of-sight detection. Specifically, the line-of-sight detection unit 211 detects which portion of the back surface side of the camera 100 the user gazes at.

In the case where the user gazes at the display unit 258 during line-of-sight detection in Step S203 (YES in Step S204), the flow proceeds to Step S205. Meanwhile, in the case where the user gazes at a portion other than the display unit 258 during line-of-sight detection in S203 (NO in Step S204), the flow proceeds to Step S230. For example, in the case where the user gazes at switches, such as the menu SW 197, during line-of-sight detection in Step S203, the flow proceeds to Step S230.

In Step S230, a holding force recovery operation of the actuator 121 is performed. The holding force recovery operation of the actuator 121 is described in detail with reference to FIG. 8 in the first embodiment, and the description thereof is omitted here. Note that, the reason for performing the holding force recovery operation in this stage is to recover the holding force of the actuator 121 before a photography preparation operation (Step S211).

In this embodiment, the holding force recovery operation of the actuator 121 is performed for the following reason when the user does not gaze at the display unit 258.

Specifically, in the live view mode, when the menu is not being displayed on the display unit 258, the image of the object is displayed on the display unit 258. However, in the case where the user gazes at a portion other than the display unit 258, even when the AF lens 120 has moved along with the holding force recovery operation of the actuator 121, the user does not easily notice that the AF lens 120 has moved. Therefore, even when the AF lens 120 has moved along with the holding force recovery operation of the actuator 121, there is a low risk of the user misunderstanding that the image pickup apparatus has a defect. For this reason, in this embodiment, when the user does not gaze at the display unit 258, the holding force recovery operation of the actuator 121 is performed.

As described above, in this embodiment, in the live view mode, when the image of the object is not displayed on the display unit 258, the holding force recovery operation of the actuator 121 is performed. After the holding force recovery operation is completed, the flow proceeds to Step S205.

Step S205 to Step S208 are the same as Step S103 to Step S106 described above in the first embodiment, and hence the descriptions thereof are omitted.

Further, Step S210 to Step S213 and Step S215 are the same as Step S110 to Step S113 and Step S115 described above in the first embodiment, and hence the descriptions thereof are omitted.

Further, Step S220 to Step S226 are the same as Step S120 to Step S126 described above in the first embodiment, and hence the descriptions thereof are omitted.

As described above, according to this embodiment, even in the case where the image of the object is displayed on the display unit 258, when the eye proximity detection unit 194 detects that the user does not gaze at the display unit 258, the holding force recovery operation of the actuator 121 is performed appropriately. Therefore, according to this embodiment, the holding force of the actuator 121 can be recovered reliably in a stage before reaching the photography preparation operation, and a more satisfactory image pickup apparatus can be provided.

Third Embodiment

Figure 13:
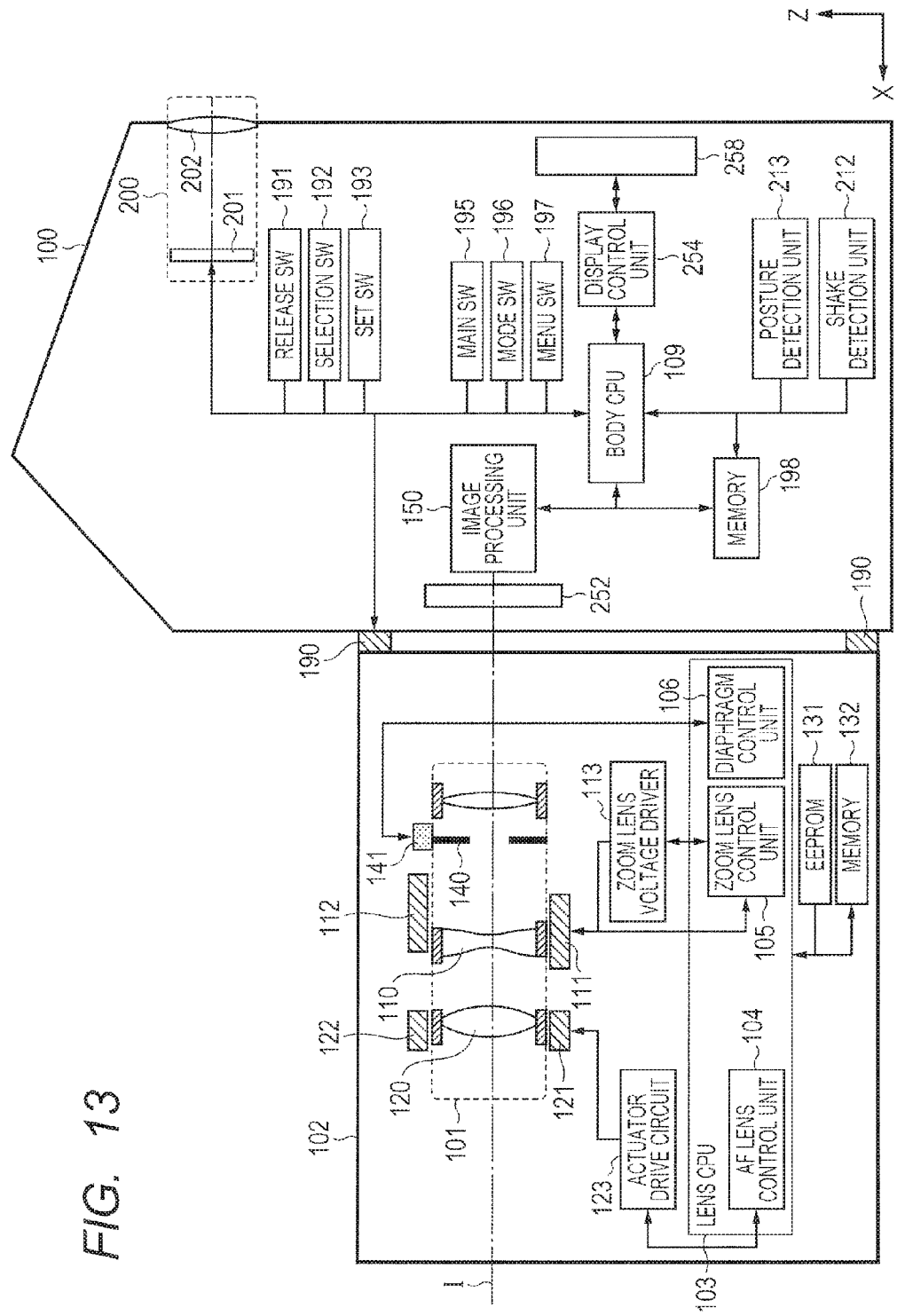
FIG. 13 is a block diagram for illustrating an image pickup apparatus according to a third embodiment of the present invention.
Figure 14:
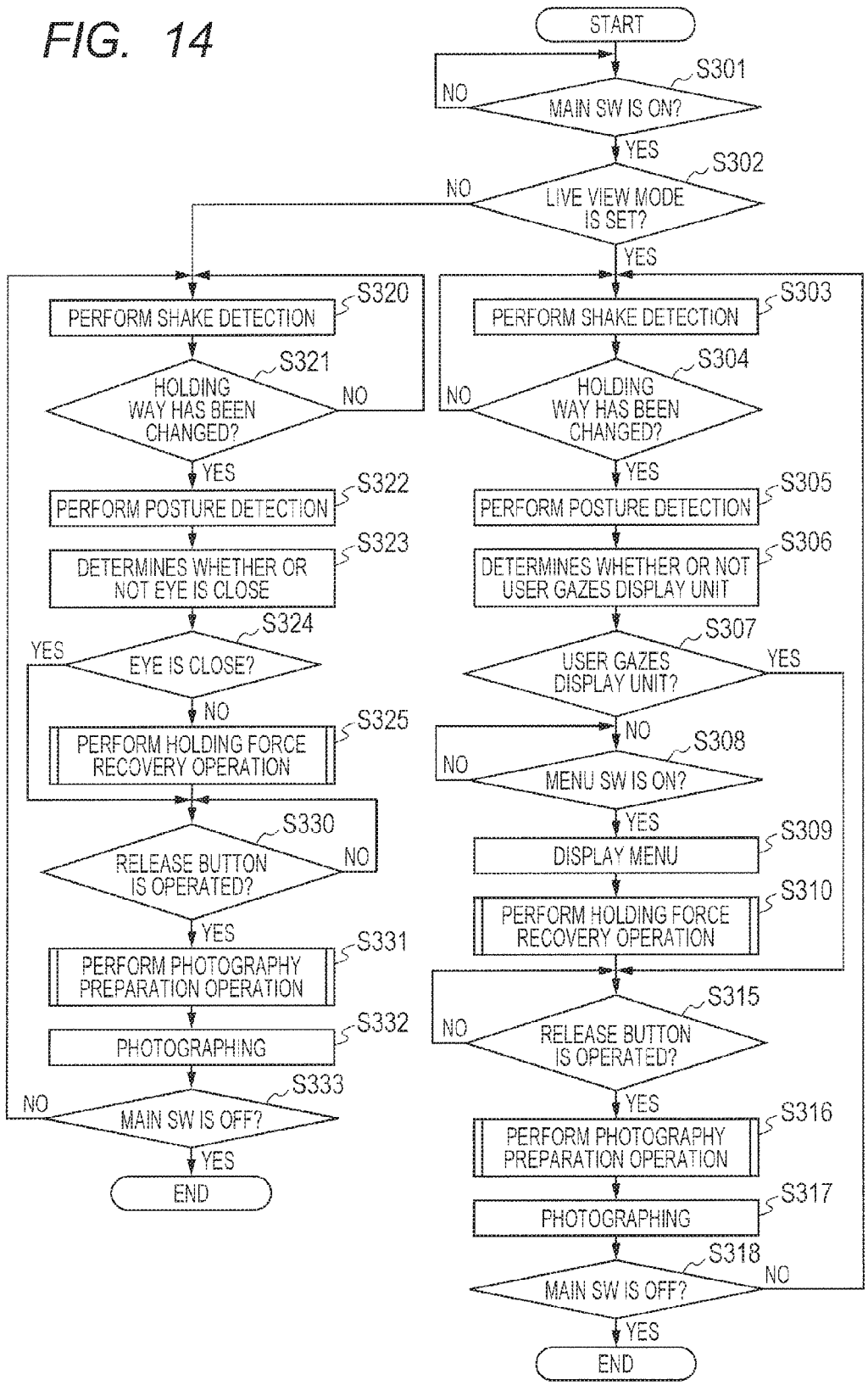
FIG. 14 is a flowchart for illustrating a main flow of an operation of the image pickup apparatus according to the third embodiment of the present invention.
Figure 15:
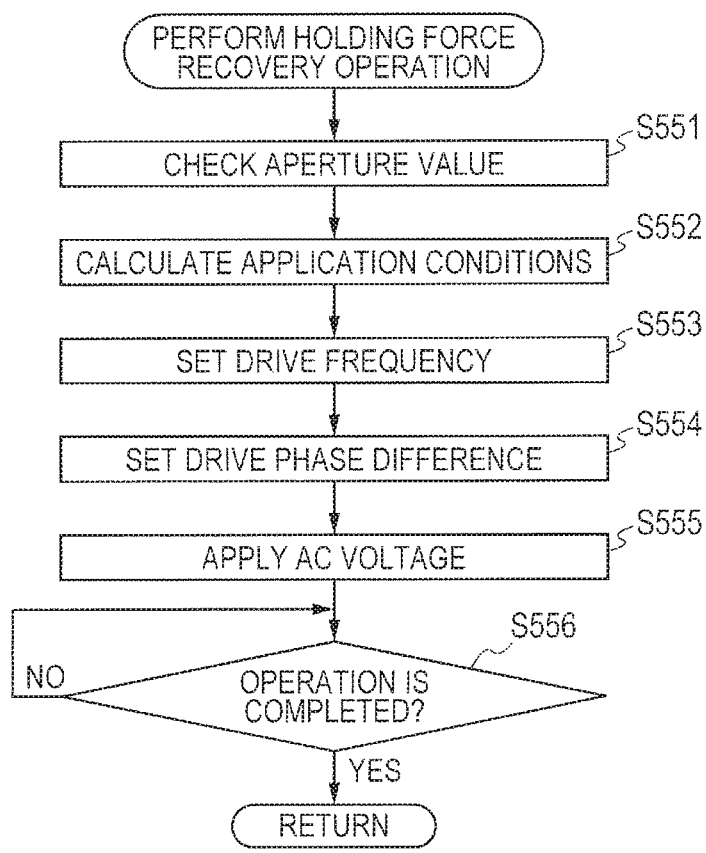
FIG. 15 is a flowchart for illustrating a holding force recovery operation.

An image pickup apparatus and a method of controlling the image pickup apparatus and a computer program according to a third embodiment of the present invention are described with reference to FIG. 13 to FIG. 15. FIG. 13 is a block diagram for illustrating the image pickup apparatus according to this embodiment. The same components as those of the image pickup apparatus according to the first or second embodiment illustrated in FIG. 1 to FIG. 12 are denoted by the same reference symbols as those therein, and the descriptions thereof are omitted or simplified.

In the image pickup apparatus according to this embodiment, a posture detection unit 213 configured to detect a posture of the camera 100 and a shake detection unit 212 configured to detect shake of the camera 100 are arranged in place of the eye proximity detection unit 194.

As illustrated in FIG. 13, the posture detection unit (detector) 213 configured to detect a posture (angle) of the camera 100 is arranged in the camera 100. As the posture detection unit 213, for example, a tilt sensor or the like can be used. It is preferred that the posture detection unit 213 can detect a tilt in directions of three axes of X, Y, and Z. The output from the posture detection unit 213 is input to the body CPU 109 and the memory 198.

Further, the shake detection unit (detector) 212 is arranged in the camera 100. The shake detection unit 212 can detect vibration, that is, shake of the camera 100. As the shake detection unit 212, an angular velocity sensor or the like can be used. It is preferred that the shake detection unit 212 can detect shake in directions of three axes of X, Y, and Z. The output from the shake detection unit 212 is input to the body CPU 109 and the memory 198.

Next, the operation of the image pickup apparatus according to this embodiment is described with reference to FIG. 14. FIG. 14 is a flowchart for illustrating the main flow of the operation of the image pickup apparatus according to this embodiment.

First, Step S301 and Step S302 are the same as Step S101 and Step S102 described above in the first embodiment, and hence the descriptions thereof are omitted. In the case where the observation mode is set to a live view mode (YES in Step S302), the flow proceeds to Step S303.

In Step S303, vibration, that is, shake of the camera 100 is detected through use of the shake detection unit 212.

In Step S304, the body CPU 109 determines whether or not the holding way of the camera 100 by the user has been changed. It is determined whether or not the holding way of the camera 100 by the user has been changed, based on the results of the detection by the shake detection unit 212 in Step S303. Specifically, it is determined whether or not the holding way of the camera 100 by the user has been changed, based on the presence/absence of a change in vibration state of the camera 100 or the way of a change in vibration state of the camera 100. More specifically, it is determined whether or not the holding way of the camera 100 has been changed, for example, based on the frequency of shake and the magnitude of shake of the camera 100 detected by the shake detection unit 212.

For example, the case where the observation mode is set to the live view mode, and the user performs photographing while gazing at the image of the object displayed on the display unit 258 is considered.

During photographing, the user is in a position of holding the camera 100 and the lens 102 with both hands so that a photographed image is not shaken, and hence shake in each direction of X, Y, and Z is small. However, when the user moves while holding the camera 100 with one hand or operates various switches arranged on the camera 100 or the lens 102 after finishing photographing, the camera 100 may be more largely shaken or the frequency of the shake of the camera 100 may be changed compared to the shake during photographing. Therefore, the body CPU 109 can determine whether or not the holding way of the camera 100 has been changed, based on the frequency and magnitude of the shake of the camera 100 detected by the shake detection unit 212.

In the case where the holding way of the camera 100 has not been changed (NO in Step S304), the flow returns to Step S303. Meanwhile, in the case where the holding way of the camera 100 has been changed (YES in Step S304), the flow proceeds to Step S305.

In Step S305, the posture detection unit 213 detects a posture of the camera 100. After that, the flow proceeds to Step S306.

In Step S306, the body CPU 109 determines whether or not the user gazes at the display unit 258 based on the information on the vibration of the camera 100 detected in Step S303 and the information on the posture of the camera 100 detected in Step S305. The information on the vibration of the camera 100 and the information on the posture of the camera 100 when the user gazes at the display unit 258 are stored in the memory 198 in advance. Thus, the body CPU 109 can determine whether or not the user gazes at the display unit 258 by comparing the information stored in the memory 198 in advance with the information on the vibration of the camera 100 detected in Step S303 and the information on the posture of the camera 100 detected in Step S305. After that, the flow proceeds to Step S307.

In the case where it is determined that the user gazes at the display unit 258 (YES in Step S307), the flow proceeds to Step S315. Meanwhile, in the case where it is determined that the user does not gaze at the display unit 258, the flow proceeds to Step S308.

In Step S308, the body CPU 109 determines whether or not the operation of the menu SW 197 for turning on a menu display has been performed. Until the operation of the menu SW 197 for turning on the menu is displayed (NO in Step S308), the menu is not displayed. Meanwhile, in the case where the operation of the menu SW 197 for turning on the menu display has been performed, the flow proceeds to Step S309.

In Step S309, the body CPU 109 performs the menu display on the display unit 258 through the display control unit 254. After that, the flow proceeds to Step S310.

In Step S310, the holding force recovery operation of the actuator 121 is performed. After that, the flow proceeds to Step S315.

In Step S315, the body CPU 109 determines whether or not the operation using the release button 191a has been performed. Until the operation using the release button 191a is performed (NO in Step S315), the flow does not proceed to Step S316. Meanwhile, in the case where the operation using the release button 191a has been performed, the flow proceeds to Step S316.

In Step S316, a photography preparation operation is performed. The photography preparation operation is the same as that in Step S111 in the first embodiment, and hence the description thereof is omitted. After that, the flow proceeds to Step S317.

In Step S317, a photography operation is performed. As described above, the photography operation itself is a known operation, and hence the description thereof is omitted. After that, the flow proceeds to Step S318.

In Step S318, the body CPU 109 determines whether or not the main SW 195 has been turned off. In the case where the main SW 195 remains turned on (NO in Step S318), the flow returns to Step S303, and the flow of a series of operations is repeated. Meanwhile, in the case where the main SW 195 has been turned off (YES in Step S318), the power source of the camera 100 is turned off, and the flow of a series of operations is finished.

In Step S302, in the case where the body CPU 109 determines that the observation mode is not set to the live view mode (NO in Step S302), that is, the observation mode is set to the viewfinder mode, the flow proceeds to Step S320.

Step S320 to Step S322 are the same as Step 303 to Step S305, and hence the descriptions thereof are omitted. After that, the flow proceeds to Step S323.

In Step S323, it is determined whether or not the eye of the user is close to the eyepiece lens 202 of the viewfinder 200 based on the information on vibration (shake) of the camera 100 detected in Step S320 and the information on a posture of the camera 100 detected in Step S322.

In the case where the eye of the user is close to the eyepiece lens 202 of the viewfinder 200 (YES in Step S324), the flow proceeds to Step S330. Meanwhile, in the case where the eye of the user is not close to the eyepiece lens 202 of the viewfinder 200 (NO in Step S324), the flow proceeds to Step S325.

In Step S325, a holding force recovery operation of the actuator 121 is performed. The holding force recovery operation of the actuator 121 is the same as that in Step S310, and hence the description thereof is omitted. After the holding force recovery operation is completed, the flow proceeds to Step S330.

Step S330 to Step S332 are the same as Step 315 to Step S317, and hence the descriptions thereof are omitted. After that, the flow proceeds to Step S333.

In Step S333, the body CPU 109 determines whether or not the main SW 195 has been turned off. In the case where the main SW 195 remains turned on (NO in Step S333), the flow returns to Step S320, and the flow of a series of operations is repeated. Meanwhile, in the case where the main SW 195 has been turned off (YES in Step S333), the power source of the camera 100 is turned off, and the flow of a series of operations is finished.

As described above, in this embodiment, it is determined whether or not the user gazes at the display unit 258 based on the information on vibration (shake) of the camera 100, the information on a posture (angle) of the camera 100, and the like. Then, even in the case where the image of the object is displayed on the display unit 258, when it is presumed that the user does not gaze at the display unit 258, the holding force recovery operation of the actuator 121 is performed appropriately. Further, in this embodiment, it is determined whether or not the eye of the user is close to the viewfinder 200 based on the information on vibration (shake) of the camera 100, the information on a posture (angle) of the camera 100, and the like. Then, when it is presumed that the eye of the user is not close to the viewfinder 200, the holding force recovery operation of the actuator 121 is performed appropriately. Therefore, in this embodiment, an image pickup apparatus capable of maintaining a satisfactory operation without causing misunderstanding in a user can also be provided.

Modified Embodiments

The present invention is not limited to the above-mentioned embodiments and can be variously modified.

For example, in the above-mentioned embodiments, the case where the AF lens 120 moves in the direction of the optical axis I during the holding force recovery operation is described as an example, but the present invention is not limited thereto. For example, the holding force recovery operation may be performed by exciting vibration in a push-up mode in the vibrator 10. In the case where the vibration in the push-up mode is excited in the vibrator 10, it is sufficient that the phase difference between the AC voltages V1 and V2 to be applied to the electrodes A1 and A2 arranged on the piezoelectric element 2 be set to 0 degrees. That is, it is sufficient that the AC voltages V1 and V2 of the same phase be applied to the electrodes A1 and A2 arranged on the piezoelectric element 2. In the case where the vibrator 10 is vibrated in the push-up mode, the actuator 121 does not move in the X-axis direction, that is, the direction of the optical axis I, and hence the AF lens 120 does not move during the holding force recovery operation. Therefore, for example, even in the case where the eye of the user is close to the eyepiece lens 202 during the holding force recovery operation, the user does not easily notice a change in focus. In this manner, the holding force recovery operation may be performed by exciting the vibration in the push-up mode in the vibrator 10.

Further, in the above-mentioned embodiments, the case where the AF lens 120 moves greatly to some degree in the direction of the optical axis I during the holding force recovery operation is described as an example, but the present invention is not limited thereto. For example, the holding force recovery operation may be performed under the conditions that the displacement of the AF lens 120 in the direction of the optical axis I caused during the holding force recovery operation falls within a range corresponding to a depth of field. With reference to FIG. 15, there is described an operation that is performed in the case where the holding force recovery operation is performed under the conditions that the displacement of the AF lens 120 in the direction of the optical axis I caused during the holding force recovery operation falls within the range corresponding to the depth of field. FIG. 15 is a flowchart for illustrating the holding force recovery operation.

First, the body CPU 109 checks a current aperture value of the diaphragm 140 through the lens CPU 103 (Step S551). After that, the flow proceeds to Step S552.

In Step S552, the body CPU 109 calculates the application conditions, that is, the frequencies and phase difference of the AC voltages V1 and V2 to be applied to the electrodes A1 and A2 arranged on the piezoelectric element 2 of the actuator 121. The depth of field varies depending on the aperture value. Thus, the displacement amount of the AF lens 120 corresponding to the depth of field varies depending on the aperture value of the diaphragm 140. Therefore, the application conditions of the AC voltages V1 and V2 to be applied to the electrodes A1 and A2 arranged on the piezoelectric element 2 are calculated in accordance with the aperture value of the diaphragm 140. Thus, the body CPU 109 calculates the application conditions of the AC voltages V1 and V2 under which the displacement of the AF lens 120 in the direction of the optical axis I caused during the holding force recovery operation falls within the range corresponding to the depth of field.

The application conditions of the AC voltages V1 and V2 to be applied to the electrodes A1 and A2 arranged on the piezoelectric element 2 are set as follows. Specifically, in the case where the application conditions of the AC voltages V1 and V2 to be applied to the electrodes A1 and A2 are set within the range of the region A illustrated in FIG. 9, the moving speed of the AF lens 120 is relatively high. In the case where the moving speed of the AF lens 120 is relatively high, even when the AF lens 120 is displaced within the range corresponding to the depth of field, there is a risk in that the user may notice a change in focus to recognize that the AF lens 120 has moved. Therefore, in this embodiment, the application conditions of the AC voltages V1 and V2 to be applied to the electrodes A1 and A2 arranged on the piezoelectric element 2 are set within a range in which the moving speed of the AF lens 120 is sufficiently low. Specifically, the application conditions of the AC voltages V1 and V2 to be applied to the electrodes A1 and A2 are set within the range of the region B illustrated in FIG. 9. Thus, the application conditions of the AC voltages V1 and V2 to be applied to the electrodes A1 and A2 are calculated. After that, the flow proceeds to Step S553.

In Step S553, the frequencies, that is, drive frequencies of the AC voltages V1 and V2 to be applied to the electrodes A1 and A2 of the piezoelectric element 2 are set in accordance with the calculation results in Step S552, and values of the drive frequencies are output to the AF lens control unit 104 arranged in the lens CPU 103. The AF lens control unit 104 outputs the values of the drive frequencies to the actuator drive circuit 123. After that, the flow proceeds to Step S554.

In Step S554, the phase difference, that is, drive phase difference between the AC voltages V1 and V2 to be applied to the electrodes A1 and A2 of the piezoelectric element 2 is set in accordance with the calculation results in Step S552, and a value of the drive phase difference is output to the AF lens control unit 104 arranged in the lens CPU 103. The AF lens control unit 104 outputs the value of the drive phase difference to the actuator drive circuit 123. After that, the flow proceeds to Step S555.

In Step S555, the actuator drive circuit 123 applies the AC voltages V1 and V2 to the electrodes A1 and A2 of the piezoelectric element 2 of the actuator 121 based on the drive frequencies set in Step S553 and the drive phase difference set in Step S554. With this, the actuator 121 moves at a predetermined speed by the displacement amount corresponding to the depth of field. Along with this, the water aggregated at a contact position between the contact portion 3*a* of the actuator 121 and the slider 4 is eliminated by vibration, and the holding force (friction force) is recovered. After that, the flow proceeds to Step S556.

In Step S556, the body CPU 109 determines whether or not the holding force recovery operation is completed. In the case where the holding force recovery operation is not completed (NO in Step S556), the application of the AC voltages V1 and V2 to the electrodes A1 and A2 arranged on the piezoelectric element 2 continue. Meanwhile, in the case where the holding force recovery operation is completed (YES in Step S556), the flow returns to the main flow.

As described above, the holding force recovery operation may be performed under the conditions that the displacement of the AF lens 120 in the direction of the optical axis I caused during the holding force recovery operation falls within the range corresponding to the depth of field.

Further, in the above-mentioned embodiments, the case where the present invention is applied to the holding force recovery operation of the actuator 121 of the AF lens 120 is described as an example, but the present invention is not limited thereto. For example, the present invention may be applied to a holding force recovery operation (second operation) of an actuator of the zoom lens drive unit 111 configured to drive the zoom lens 110. The actuator of the zoom lens drive unit 111 performs an operation of changing a focal length by driving the zoom lens 110, that is, performs a focal length changing operation (first operation).

Figure 16:
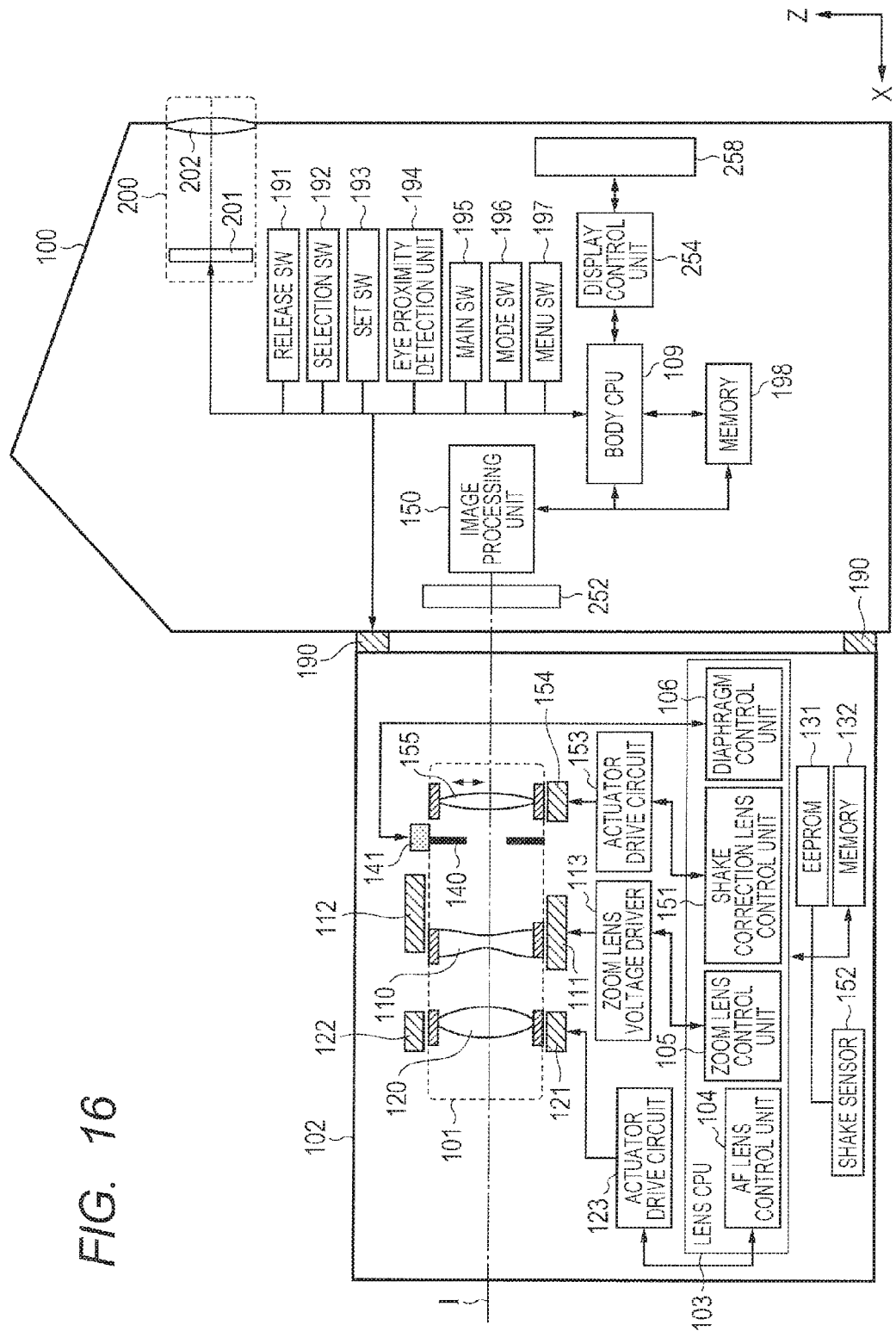
FIG. 16 is a block diagram for illustrating an image pickup apparatus according to a modified embodiment of the present invention.

Further, in the above-mentioned embodiments, the case where the present invention is applied to the holding force recovery operation of the actuator 121 of the AF lens 120 is described as an example, but the present invention is not limited thereto. The present invention may be applied to a holding force recovery operation of an actuator of a shake correction lens 155 for hand shake correction. Further, the present invention may be applied to a holding force recovery operation of an actuator of the image pickup element 252 for hand shake correction. FIG. 16 is a block diagram for illustrating an image pickup apparatus according to a modified embodiment of the present invention. FIG. 16 is an illustration of the case where the present invention is applied to a holding force recovery operation (second operation) of an actuator of the shake correction lens 155. As illustrated in FIG. 16, the shake correction lens 155 is arranged in the photography optical system 101. The shake correction lens 155 is driven by an actuator 154. The actuator 154 performs a shake correction operation (first operation). The actuator 154 is controlled by a shake correction lens control unit 151 arranged in the lens CPU 103 through an actuator drive circuit 153. A shake sensor 152 is connected to the lens CPU 103. As the shake sensor 152, for example, an angular velocity sensor or the like can be used. The shake correction lens control unit 151 arranged in the lens CPU 103 calculates a drive amount of the shake correction lens 155 based on the hand shake amount detected by the shake sensor 152. A signal indicating the drive amount calculated by the calculation, that is, the drive signal having a digital value is output from the shake correction lens control unit 151 to the actuator drive circuit 153. The actuator drive circuit 153 supplies electric power to the actuator 154 based on the drive signal (drive voltage) output from the shake correction lens control unit 151. It is sufficient that the same holding force recovery operation as that performed with respect to the actuator 121 in the above-mentioned embodiments be performed with respect to the actuator 154. If the holding force recovery operation is performed with respect to the actuator 154 configured to drive the shake correction lens 155, the shake correction lens 155 does not move in the direction orthogonal to the optical axis I even when external force is applied. Therefore, when the holding force recovery operation is performed with respect to the actuator 154 configured to drive the shake correction lens 155, an image pickup apparatus capable of performing shake correction reliably can be provided.

Further, in the above-mentioned embodiments, the case where the operation for maintenance of the actuator 121 is the holding force recovery operation is described as an example, but the operation for maintenance of the actuator 121 is not limited to the holding force recovery operation. In the case where the actuator 121 is not an ultrasonic motor, it may be necessary to perform maintenance other than the holding force recovery operation in the actuator 121. The present invention can be widely applied to the case where the maintenance, which may cause the user to misunderstand that the image pickup apparatus has a defect, is performed in the actuator 121.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-039097, filed Feb. 27, 2015, which is hereby incorporated by reference herein in its entirety.

What is claimed is:

1. An image pickup apparatus, comprising:
a viewfinder;
a detector configured to detect whether or not a user observes the object through use of the viewfinder, and
a controller configured to control an actuator, the actuator being configured to drive at least a part of a photography optical system and being capable of performing a first operation and a second operation different from the first operation, the second operation being an operation for maintenance of the actuator,
wherein, when the detector detects that the user does not observe the object through use of the viewfinder, the controller causes the actuator to perform the second operation, and when the detector detects that the user observes the object through use of the viewfinder, the controller does not cause the actuator to perform the second operation,
wherein the actuator comprises a vibrator including a piezoelectric element, and
wherein, in the second operation, an AC voltage with a higher frequency than a frequency of an AC voltage to be applied to the piezoelectric element in the first operation is applied to the piezoelectric element.

2. The image pickup apparatus according to claim 1, wherein the first operation comprises at least any one of a focus operation, a focal length changing operation, or a shake correction operation.

3. The image pickup apparatus according to claim 1, wherein the detector is configured to detect that an eye of the user is close to the viewfinder.

4. The image pickup apparatus according to claim 1, wherein the detector is configured to detect a posture of the image pickup apparatus.

5. The image pickup apparatus according to claim 1, wherein the detector is configured to detect shake of the image pickup apparatus.

6. An image pickup apparatus, comprising:
a display configured to display an image of an object;
a detector configured to detect whether or not a user observes the object through use of the display; and
a controller configured to control an actuator, the actuator being configured to drive at least a part of a photography optical system and being capable of performing a first operation and a second operation different from the first operation, the second operation being an operation for maintenance of the actuator,
wherein, in one of cases where an image of the object is not displayed on the display and where the detector detects that the user does not observe the object through use of the display, the controller causes the actuator to perform the second operation, and in one of cases where the image of the object is displayed on the display and where the detector detects that the user observes the object through use of the display, the controller does not cause the actuator to perform the second operation, wherein the actuator comprises a vibrator including a piezoelectric element, and wherein, in the second operation, an AC voltage with a higher frequency than a frequency of an AC voltage to be applied to the piezoelectric element in the first operation is applied to the piezoelectric element.

7. The image pickup apparatus according to claim 6, wherein the detector is configured to detect a line of sight of the user.

8. A method of controlling an image pickup apparatus, comprising:

detecting whether or not a user observes an object through use of a viewfinder;

causing an actuator to perform a second operation when it is detected that the user does not observe the object through use of the viewfinder, the actuator being configured to drive at least a part of a photography optical system and being capable of performing a first operation and the second operation different from the first operation, the second operation being an operation for maintenance of the actuator; and causing the actuator not to perform the second operation when it is detected that the user observes the object through use of the viewfinder, wherein the actuator comprises a vibrator including a piezoelectric element, and wherein, in the second operation, an AC voltage with a higher frequency than a frequency of an AC voltage to be applied to the piezoelectric element in the first operation is applied to the piezoelectric element.

9. A method of controlling an image pickup apparatus, comprising:

detecting whether or not a user observes an object through use of a display;

causing an actuator to perform a second operation in one of cases where an image of the object is not displayed on the display and where it is detected that the user does not observe the object through use of the display, the actuator being configured to drive at least a part of a photography optical system and being capable of performing a first operation and the second operation different from the first operation, the second operation being an operation for maintenance of the actuator; and causing the actuator not to perform the second operation in one of cases where the image of the object is displayed on the display and where it is detected that the user observes the object through use of the display, wherein the actuator comprises a vibrator including a piezoelectric element, and wherein, in the second operation, an AC voltage with a higher frequency than a frequency of an AC voltage to be applied to the piezoelectric element in the first operation is applied to the piezoelectric element.

10. A non-transitory computer-readable storage medium having stored thereon a program for causing a computer to function as a controller configured to cause an actuator to perform a second operation when it is detected that a user does not observe an object through use of a viewfinder, the actuator being configured to drive at least a part of a photography optical system and being capable of performing a first operation and the second operation different from the first operation, the second operation being an operation for maintenance of the actuator, wherein the controller is configured to cause the actuator not to perform the second operation when it is detected that the user observes the object through use of the viewfinder, wherein the actuator comprises a vibrator including a piezoelectric element, and wherein, in the second operation, an AC voltage with a higher frequency than a frequency of an AC voltage to be applied to the piezoelectric element in the first operation is applied to the piezoelectric element.

11. A non-transitory computer-readable storage medium having stored thereon a program for causing a computer to function as a controller configured to cause an actuator to perform a second operation in one of cases where an image of an object is not displayed on a display and where it is detected that a user does not observe the object through use of the display, the actuator being configured to drive at least a part of a photography optical system and being capable of performing a first operation and the second operation different from the first operation, the second operation being an operation for maintenance of the actuator, wherein the controller configured to cases the actuator not to perform the second operation in one of cases where the image of the object is displayed on the display and where it is detected that the user observes the object through use of the display, wherein the actuator comprises a vibrator including a piezoelectric element, and wherein, in the second operation, an AC voltage with a higher frequency than a frequency of an AC voltage to be applied to the piezoelectric element in the first operation is applied to the piezoelectric element.

* * * * *